United States Patent [19]

Yoshida

[11] Patent Number: 5,297,072
[45] Date of Patent: Mar. 22, 1994

[54] SQUARE-ROOT OPERATING CIRCUIT ADAPTED TO PERFORM A SQUARE-ROOT AT HIGH SPEED AND APPLY TO BOTH OF BINARY SIGNAL AND QUADRUPLE SIGNAL

[75] Inventor: Yukihiro Yoshida, Nara, Japan

[73] Assignee: Sharp Kabushiki Kaisha, Osaka, Japan

[21] Appl. No.: 31,996

[22] Filed: Mar. 16, 1993

[30] Foreign Application Priority Data

Mar. 18, 1992 [JP] Japan .................................. 4-62451
Feb. 16, 1993 [JP] Japan .................................. 5-26339

[51] Int. Cl.$^5$ .............................................. G06F 7/38
[52] U.S. Cl. .................................................... 364/752
[58] Field of Search ......................................... 364/752

[56] References Cited

U.S. PATENT DOCUMENTS 3,829,672 8/1974 Sather .................................. 364/752
4,757,467 7/1988 Dietrich et al. ..................... 364/752

FOREIGN PATENT DOCUMENTS 3-77132 4/1991 Japan .
3-77133 4/1991 Japan .

Primary Examiner—Tan V. Mai

[57] ABSTRACT

A square-root operating circuit performs square-root at high speed and applies to both a binary signal and a quadruple signal. The square-root operating circuit includes $X_2$ circuits, the performing unit, and adding circuits. The $X_2$ circuits performs a square of an input signal. The performing unit is arranged to perform the square of a candidate square-root of any one of an originally quadruple logic input signal and a quadruple logic input signal converted from a binary logic. The adding circuits compare the input signal with a square of a candidate square-root at each digit and output a result of the comparison so as to discriminate a proper digit of the square-root.

21 Claims, 27 Drawing Sheets

⊕ ; ADDING CIRCUIT
$x^2$ ; $X^2$ CIRCUIT

Fig. 2

| ADDRESS | JUDGEMENT | INSTRUCTION | NEXT ADDRESS |
|---|---|---|---|
| $A_1$ | | $n \rightarrow i$ | $A_2$ |
| $A_2$ | | $1 \rightarrow X_{2i}, 1 \rightarrow X_{2i-1}$ | $A_3$ |
| $A_3$ | | $X^2 \rightarrow W$ | $A_4$ |
| $A_4$ | | $S>W, S=W, S<W$ | |
| | $J_1$ | | $A_9$ |
| | $J_2$ | | $A_9$ |
| | $J_3$ | $1 \rightarrow X_{2i}, 0 \rightarrow X_{2i-1}$ | $A_5$ |
| $A_5$ | | $X^2 \rightarrow W$ | $A_6$ |
| $A_6$ | | $S>W, S=W, S<W$ | |
| | $J_1$ | | $A_9$ |
| | $J_2$ | | $A_9$ |
| | $J_3$ | $0 \rightarrow X_{2i}, 1 \rightarrow X_{2i-1}$ | $A_7$ |
| $A_7$ | | $X^2 \rightarrow W$ | $A_8$ |
| $A_8$ | | $S>W, S=W, S<W$ | |
| | $J_1$ | | $A_9$ |
| | $J_2$ | | $A_9$ |
| | $J_3$ | $0 \rightarrow X_{2i}, 0 \rightarrow X_{2i-1}$ | $A_9$ |
| $A_9$ | | $i = 1$ | |
| | $\overline{J_4}$ | $i - 1 \rightarrow i$ | $A_2$ |
| | $J_4$ | | $A_0$ |

Fig. 4

| ADDRESS | JUDGEMENT | INSTRUCTION | NEXT ADDRESS |
|---|---|---|---|
| $A_1$ | | $n \rightarrow i$ | $A_2$ |
| $A_2$ | | $1 \rightarrow X_{2i}, Y_{2i}, 1 \rightarrow X_{2i-1}, Y_{2i-1}$ | $A_3$ |
| $A_3$ | | $XY \rightarrow W$ | $A_4$ |
| $A_4$ | | $S>W, S=W, S<W$ | |
| | $J_1$ | | $A_9$ |
| | $J_2$ | | $A_9$ |
| | $J_3$ | $1 \rightarrow X_{2i}, Y_{2i}, 0 \rightarrow X_{2i-1}, Y_{2i-1}$ | $A_5$ |
| $A_5$ | | $XY \rightarrow W$ | $A_6$ |
| $A_6$ | | $S>W, S=W, S<W$ | |
| | $J_1$ | | $A_9$ |
| | $J_2$ | | $A_9$ |
| | $J_3$ | $0 \rightarrow X_{2i}, Y_{2i}, 1 \rightarrow X_{2i-1}, Y_{2i-1}$ | $A_7$ |
| $A_7$ | | $XY \rightarrow W$ | $A_8$ |
| $A_8$ | | $S>W, S=W, S<W$ | |
| | $J_1$ | | $A_9$ |
| | $J_2$ | | $A_9$ |
| | $J_3$ | $0 \rightarrow X_{2i}, Y_{2i}, 0 \rightarrow X_{2i-1}, Y_{2i-1}$ | $A_9$ |
| $A_9$ | | $i = 1$ | |
| | $\overline{J_4}$ | $i-1 \rightarrow i$ | $A_2$ |
| | $J_4$ | | $A_0$ |

Fig. 31

| ADDRES | JUDGEMENT | INSTRUCTION | NEXT ADDRESS |
|---|---|---|---|
| $A_1$ | | $n \to i$ | $A_2$ |
| $A_2$ | | $1 \to X_{2i}, 1 \to X_{2i-1}$ | $A_3$ |
| $A_3$ | | $X^2 \to W$ | $A_4$ |
| $A_4$ | | $S>W, S=W, S<W$ | |
| | $J_1$ | | $A_9$ |
| | $J_2$ | | $A_0$ |
| | $J_3$ | $1 \to X_{2i}, 0 \to X_{2i-1}$ | $A_5$ |
| $A_5$ | | $X^2 \to W$ | $A_6$ |
| $A_6$ | | $S>W, S=W, S<W$ | |
| | $J_1$ | | $A_9$ |
| | $J_2$ | | $A_0$ |
| | $J_3$ | $0 \to X_{2i}, 1 \to X_{2i-1}$ | $A_7$ |
| $A_7$ | | $X^2 \to W$ | $A_8$ |
| $A_8$ | | $S>W, S=W, S<W$ | |
| | $J_1$ | | $A_9$ |
| | $J_2$ | | $A_0$ |
| | $J_3$ | $0 \to X_{2i}, 0 \to X_{2i-1}$ | $A_9$ |
| $A_9$ | | $i = 1$ | |
| | $\overline{J_4}$ | $i-1 \to i$ | $A_2$ |
| | $J_4$ | | $A_0$ |

Fig. 31

| ADDRES | JUDGEMENT | INSTRUCTION | NEXT ADDRESS |
|---|---|---|---|
| $A_1$ | | $n \to i$ | $A_2$ |
| $A_2$ | | $1 \to X_{2i}$, $1 \to X_{2i-1}$ | $A_3$ |
| $A_3$ | | $X^2 \to W$ | $A_4$ |
| $A_4$ | | $S > W$, $S = W$, $S < W$ | |
| | $J_1$ | | $A_9$ |
| | $J_2$ | | $A_0$ |
| | $J_3$ | $1 \to X_{2i}$, $0 \to X_{2i-1}$ | $A_5$ |
| $A_5$ | | $X^2 \to W$ | $A_6$ |
| $A_6$ | | $S > W$, $S = W$, $S < W$ | |
| | $J_1$ | | $A_9$ |
| | $J_2$ | | $A_0$ |
| | $J_3$ | $0 \to X_{2i}$, $1 \to X_{2i-1}$ | $A_7$ |
| $A_7$ | | $X^2 \to W$ | $A_8$ |
| $A_8$ | | $S > W$, $S = W$, $S < W$ | |
| | $J_1$ | | $A_9$ |
| | $J_2$ | | $A_0$ |
| | $J_3$ | $0 \to X_{2i}$, $0 \to X_{2i-1}$ | $A_9$ |
| $A_9$ | | $i = 1$ | |
| | $\overline{J_4}$ | $i - 1 \to i$ | $A_2$ |
| | $J_4$ | | $A_0$ |

Fig. 34

| ADDRES | JUDGEMENT | INSTRUCTION | NEX ADDRESS |
|---|---|---|---|
| $A_1$ | | $n \to i$ | $A_2$ |
| $A_2$ | | $1 \to X_{2i}, Y_{2i}, 1 \to X_{2i-1}, Y_{2i-1}$ | $A_3$ |
| $A_3$ | | $XY \to W$ | $A_4$ |
| $A_4$ | | $S>W, S=W, S<W$ | |
| | $J_1$ | | $A_9$ |
| | $J_2$ | | $A_0$ |
| | $J_3$ | $1 \to X_{2i}, Y_{2i}, 0 \to X_{2i-1}, Y_{2i-1}$ | $A_5$ |
| $A_5$ | | $XY \to W$ | $A_6$ |
| $A_6$ | | $S>W, S=W, S<W$ | |
| | $J_1$ | | $A_9$ |
| | $J_2$ | | $A_0$ |
| | $J_3$ | $0 \to X_{2i}, Y_{2i}; 1 \to X_{2i-1}, Y_{2i-1}$ | $A_7$ |
| $A_7$ | | $XY \to W$ | $A_8$ |
| $A_8$ | | $S>W, S=W, S<W$ | |
| | $J_1$ | | $A_9$ |
| | $J_2$ | | $A_0$ |
| | $J_3$ | $0 \to X_{2i}, Y_{2i}, 0 \to X_{2i-1}, Y_{2i-1}$ | $A_9$ |
| $A_9$ | | $i = 1$ | |
| | $\overline{J_4}$ | $i-1 \to i$ | $A_2$ |
| | $J_4$ | | $A_0$ |

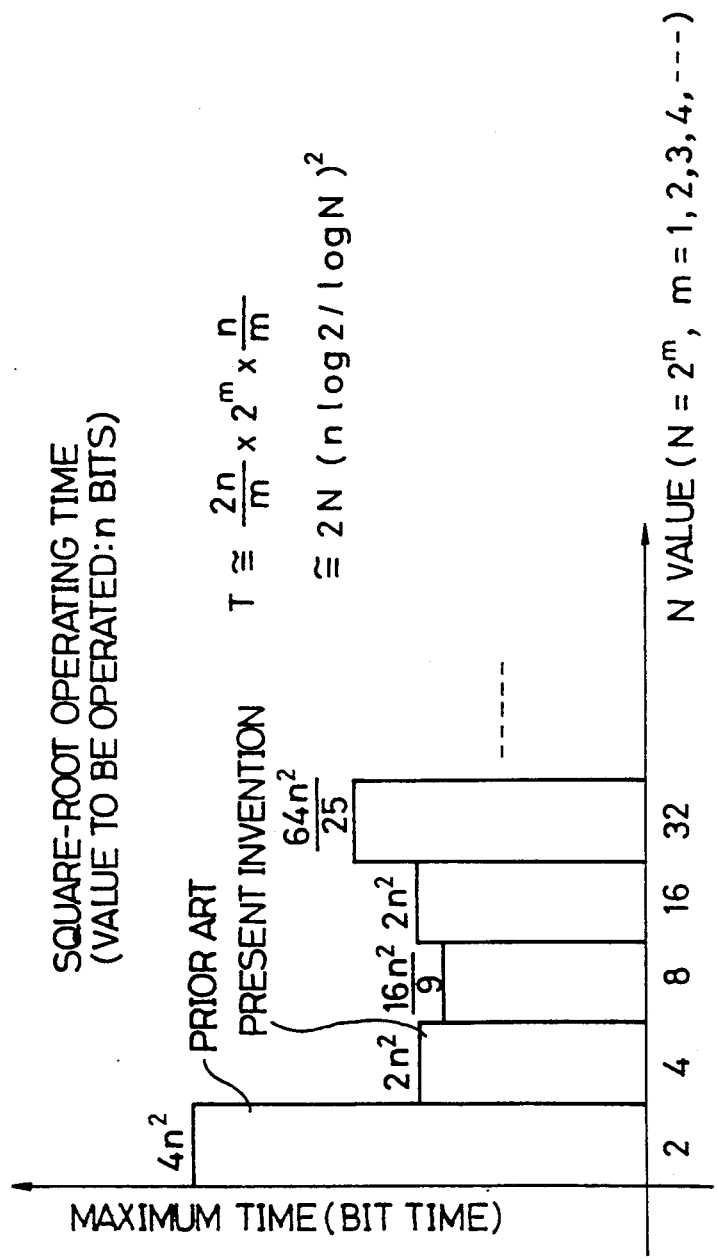

SQUARE-ROOT OPERATING CIRCUIT ADAPTED TO PERFORM A SQUARE-ROOT AT HIGH SPEED AND APPLY TO BOTH OF BINARY SIGNAL AND QUADRUPLE SIGNAL

BACKGROUND OF THE INVENTION

1. Field of the Invention

The present invention relates to a numerical-value operating circuit adaptively used for computers such as a personal computer and a workstation, and more particularly to a square-root operating circuit applied to a built-in numerical value operating circuit such as a digital signal processor and a microprocessor.

2. Description of the Related Art

Presently digital information processing such as in a computer field speeds up increasingly. When performing signal processing or information processing, speeding up of a square-root operation is required, because numerous square roots are used in the field of numerical value calculation.

In this field, it is known such a technology that necessary square roots are obtained by repetitively performing an addition and a substraction with respect to minuends and augends, thereby it has difficulty in enhancing the speed of the square-root operation. Consequently, speeding up of the numerical-value operation in the information processing field has been considered difficult.

SUMMARY OF THE INVENTION

It is an object of the present invention to provide a square-root operating circuit adapter to perform a square-root at high speed and apply to both of a binary signal and a quadruple signal.

The object of the present invention can be achieved by a square-root operating circuit adapted to perform a square-root at high speed and apply to both of a binary signal and a quadruple signal includes a unit for performing a square of an input signal, the performing unit being arranged to perform the square of a candidate square root of any one of an originally quadruple logic input signal and a quadruple logic input signal converted from a binary logic, and a unit for comparing the input signal with a square of a candidate square root at each digit and for outputting a result of the comparison so as to discriminate a proper digit of the square root.

The performing unit includes an equivalent circuit for inputting the input signal and for outputting an equivalent signal having an equivalent value which corresponds to the input signal, a first logic circuit connected to the equivalent circuit for performing a logical product of the equivalent signal output from the equivalent circuit with a logical product of the equivalent signal having a different equivalent value and for outputting a signal corresponding to a result of the logical product, a second logic circuit connected to the first logic circuit for performing a logical sum of the signal output from the first logic circuit r67 for outputting a signal corresponding to a result of the logical sum, a delay circuit connected to the second logic circuit for delaying a specific signal output from the second logic circuit and for outputting the delayed signal, and a logic gate unit connected to the second logic circuit for performing a logical sum of another specific signal output from the second logic circuit with an input signal supplied externally.

The equivalent circuit is arranged to receive a plurality of input signals and to output equivalent signals having equivalent values corresponding to the plurality of input signals, respectively.

The first logic circuit includes a plurality of AND gates, each of the AND gates being adapted to receive two equivalent signals having different equivalent values for performing a logic product therebetween and to output a signal corresponding to a result of the logic product.

The first logic circuit is so arranged that at least one of the plurality of AND gates outputs the signal corresponding to the result of the logic product.

The second logic circuit is so arranged that the signals output from the plurality of AND gates are separated into a plurality of different groups, each of the plurality of groups being arranged to output a signal corresponding to the result of the logic sum.

The delay circuit includes a plurality of delaying elements, each of the delaying elements being arranged to receive a signal output from a corresponding group of the plurality of groups in the second logic circuit for delaying the received signal with a predetermined phase shift and to output the delayed signal as a carry signal.

The logic gate unit includes a plurality of logic gates, each of the logic gates being arranged to receive a signal output from a corresponding group of the plurality of groups in the second logic circuit for performing a logic sum of the received signal with the input received externally and to output a signal corresponding to a result of the logic sum as a binary signal.

The comparing unit is an adding circuit which is selectively adapted to employ one of a quadruple logic and a binary logic.

The adding circuit includes a logic converting circuit and is so arranged that a plurality of binary signals are converted into a plurality of quadruple signals through the logic converting circuit.

The adding circuit includes a binary logic input circuit and is so arranged that a plurality of binary signals are converted into a plurality of signals through the binary logic input circuit.

The square-root operating circuit is a parallel squaring circuit which is adapted to perform a parallel squaring operation.

The parallel squaring circuit further includes a plurality of first shift registers connected to the performing unit for holding a value corresponding to the input signal.

The parallel squaring circuit further includes a plurality of second shift registers for holding a result obtained in the comparing unit.

The comparing unit is so arranged that a search signal is supplied to each digit determined in parallel and the comparison in determined by a first digit of timing in the search signal.

The comparing unit comprises an equivalent circuit for inputting the input signal and for outputting an equivalent signal having an equivalent value which corresponds to the input signal, a first logic circuit connected to the equivalent circuit for performing a logical product of the equivalent signal output from the equivalent circuit with a logical product of the equivalent signal having a different equivalent value and for outputting a signal corresponding to a result of the logical product, and a second logic circuit connected to the first logic circuit for performing a logical sum of the signal output from the first logic circuit and for outputting a signal corresponding to a result of the logical sum.

The equivalent circuit is arranged such that the input signal includes two kinds of input signals, the two kinds of input signals including a first kind of input signal and a second kind of input signal.

The second logic circuit is so arranged that the signal corresponding to the result of the logic sum includes three kinds of output signals according to a comparison result between the two kinds of input signals, the three kinds of output signals including a first kind of output signal, a second kind of output signal, and a third kind of output signal.

The second logic circuit is so arranged that the first kind of output signal represents the first kind of input signal being larger than the second kind of input signal, the second kind of output signal represents the fist kind of input signal being equal to the second kind of input signal, and the third kind of output signal represents the first kind of input signal being less than the second kind of input signal, as the comparison result.

In operation, the originally given quadruple input signal or the quadruple input signal converted from a binary input signal through a predetermined converting circuit is sequentially compared with the square of the candidate square root given by a squaring circuit for deriving the square root from the top digit in sequence. When a digit having different values from each other is detected, it is determined if the input signal is larger or smaller than the square of the candidate square root.

Further objects and advantages of the present invention will be apparent from the following description of the preferred embodiment of the invention as illustrated in the accompanying drawings.

BRIEF DESCRIPTION OF THE DRAWINGS

Fig. 2 is a view showing a program for executing the flowchart of FIG. 1;

FIG. 4 is a program for executing the flowchart of FIG. 3;

FIG. 31 is a view showing a program for executing the flowchart of FIG. 30;

FIG. 32 is a circuit diagram showing an address circuit for a square-root operating program shown in FIG. 31 or FIG. 34;

FIG. 34 is a view showing a program for executing the flowchart of FIG. 33;

FIG. 35 is an explanatory graph showing the square-root operating time of this invention known by the inventors in contrast.

DESCRIPTION OF THE PREFERRED EMBODIMENT

Referring to the accompanying drawings, and embodiment of a square-root operating circuit according to the present invention will be described in details.

At first, an operating system employed in the square-root operating circuit according to the embodiment will be described as referring to the flowchart shown in FIG. 1.

Figure 1:
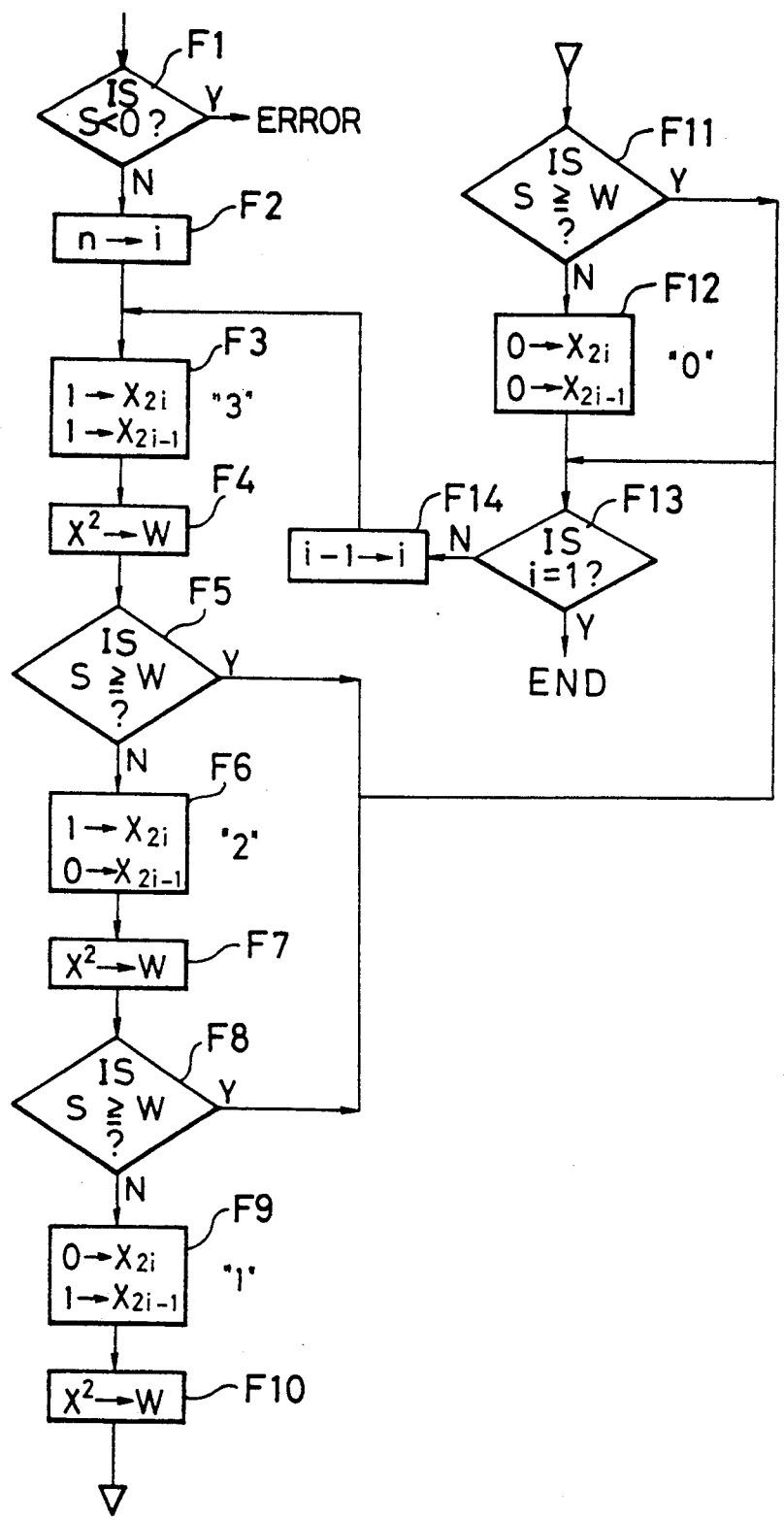
FIG. 1 is a flowchart showing an operation of a squaring type square-root operating circuit according to the present invention.

In FIG. 1, a S denotes a value to be operated as a square root. The value S is stored in an 2n-bit S register. A candidate value X of a square root is stored in an X register. W denotes a square of the candidate value X. The square W is stored in a W register. Before starting the square-root operation, the value S and the square-root candidate value X are stored from the most significant digit in the corresponding registers.

An i in FIG. 1 denotes a number of each digit used in a flowchart or a program. It is conveniently used for explaining the system of a square root. The process of i−1→i can be automatically executed by means of a proper circuit such as a counter.

In FIGS. 1 and 2, the determinations of n→i, i−1→i, and i=1 are conveniently executed for explaining the operating system. It does not need any special operation. This determining is automatically and rapidly executed at the necessary steps (F2, F13, F14) and addresses ($A_1$, $A_g$) through the effect of a proper circuit such as a counter. This holds true for FIG. 3.

In turn, the description will be oriented to floating-point operation. Assume that the floating point S has a mantissa S and an exponent part P. For a quadruple logic, the radix is 4. Hence, a square root x may be represented as follows.

$$x = (S 4^P)^{\frac{1}{2}} = S^{\frac{1}{2}} 2^P$$

It is understood from this expression that it is not necessary to determine if the exponent part is an odd or an even. This is a feature of a quadruple root operation. It means that P is directly used as an exponent part of the square root x.

Assume that a value to be operated S is zero or a positive value. If it is negative, then it is determined that an error takes place at a step F1. At a step F2, a value of i is substituted for n. To obtain a square root of the mantissa S, at first, a value of "3" is placed at the most significant digit of the X register as a candidate value of a square root (step F3).

Then, $X^2$ is operated and is substituted for W (step F4). Next, S is compared with W (step F5). If $S \geq W$ is determined, it indicates that a value of "3" is the most significant digit. The operation goes to a step for obtaining a next digit of the square root (steps F13 and F14).

On the other hand, if $S < W$ is determined at the step F5, a value of "2" is stored as a candidate of a square root in the X register (step F6). At the next steps F7 and F8, it is determined whether or not the most significant digit of the square root is "2". If the most significant digit of the square root is "2", then like the above, the operation goes to the step F13 for obtaining the next digit. If the most significant digit of the square root is not "2", then it is determined whether or not the most significant digit is "1" (steps F9 to F11). If the most significant digit of the square root is "1", the operation goes to the step F13 for the same as described above. If the most significant digit of the square root is not "1", then a zero is substituted for the most significant digit of the square root, and the operation goes to the step F13 for the same as described above.

To obtain each digit value of the square root to be stored at final stage, the above-described operation must be executed n times. An example of a program created for executing this square-root operating system will be illustrated in FIG. 2.

In FIG. 2, $A_0$ denotes an initial address. $A_1$, $A_2$, $A_3$, ..., $A_g$ denote an execution address at which a square root is obtained.

This square-root operating system is arranged to obtain a square of a square-root candidate and compare the mantissa with the square at each digit for the purpose of obtaining a square root. This square-root operating system, therefore, provides far faster operation than known operation.

Figure 3:
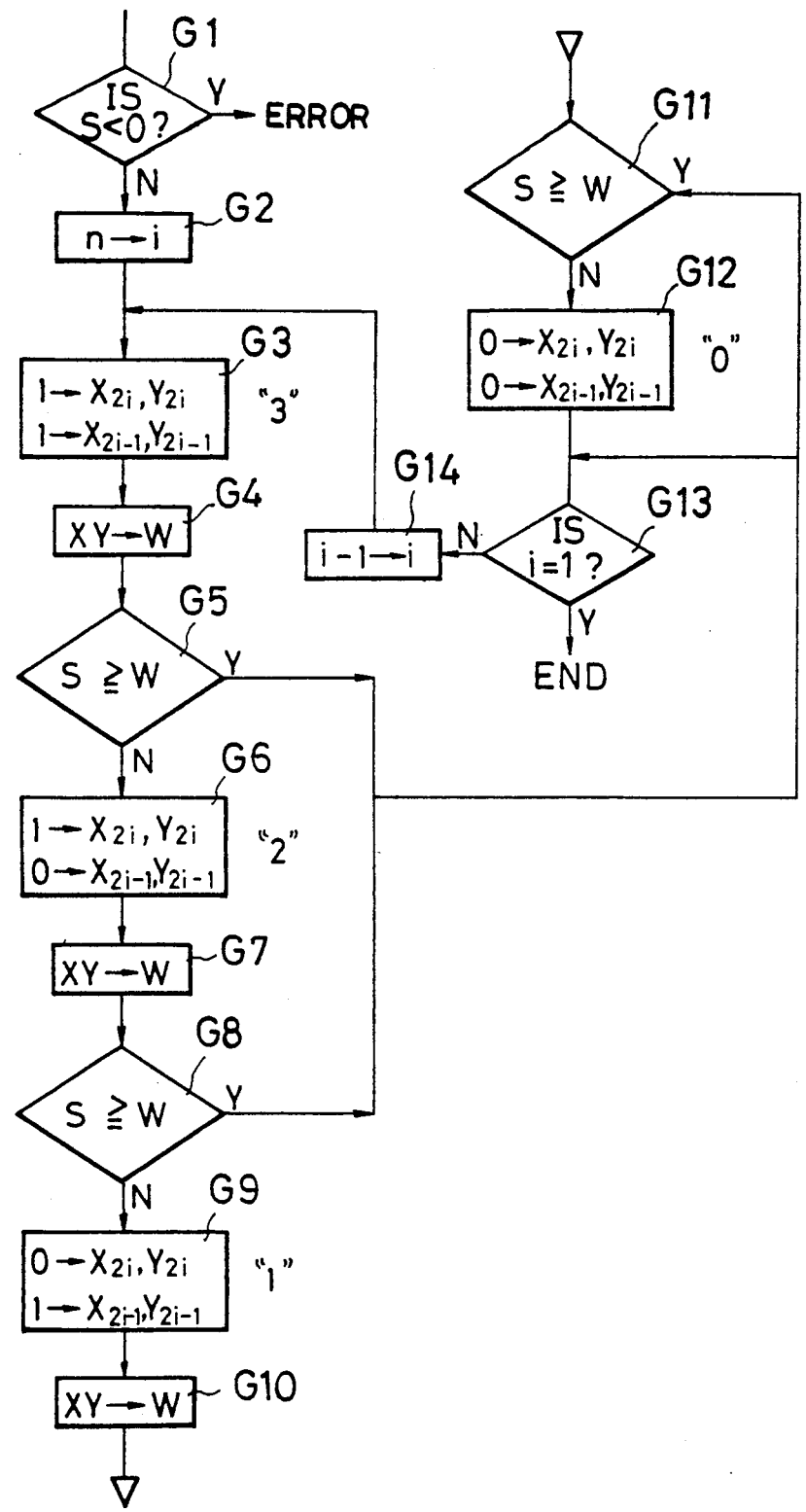
FIG. 3 is a flowchart showing an operation of the multiplying type square-root operation circuit according to the m present invention.

Though the circuit is made large in size, the square-root operating system may be expanded into a general operating system like a flowchart shown in FIG. 3 and a program shown in FIG. 4.

Referring to the FIGS. 3 and 4, the general operating system will be described in detail.

Assume that a value to be operated S is zero or a positive value. If it is negative, then it is determined that an error takes place at a step G1. At a step G2, a value of i is substituted for n. To obtain a square root of the mantissa S, at first, a value of "3" is placed at the most significant digits for the X and Y registers as a whole as well as a candidate value of a square root (step G3). Then an multiplication of XY is operated and is substituted for W (step G4).

Next, S is compared with W (step G5). If $S \geq W$ is determined, it indicates that a value of "3" is the most significant digit. The operation goes to a step for obtaining a next digit of the square root (steps G13 and G14).

On the other hand, if $S < W$ is determined at the step G5, a value of "2" is stored as a candidate of a square root in the X register (step G6). At the next steps G7 and G8, it is determined whether or not the most significant digit of the square root is "2". If the most significant digit of the square root is "2", then like the above, the operation goes to the step G13 for obtaining the next digit. If the most significant digit of the square root is not "2", then it is determined whether or not the most significant digit is "1" (steps G9 and G11). If the most significant digit of the square root is "1", the operation goes to the step G13 for the same as described above. If the most significant digit of the square root is not "1", then a zero is substituted for the most significant digit of the square root, and the operation goes to the step G13 as described above.

To obtain each digit value of the square root to be stored at a final stage, the above-described operation must be executed n times. An example of a program created for executing this square-root operating system will be illustrated in FIG. 4.

In FIG. 4, $A_0$ denotes an initial address. $A_1$, $A_2$, $A_3$, ..., $A_g$ denote an execution address at which a square root is obtained.

When executing the operating system as shown in FIGS. 3 and 4, a parallel multiplier disclosed in Japanese Patent Application No. 3-323205. This operating system is analogous to the operating system shown in FIGS. 1 and 2 as described above.

In this embodiment, as described above, the candidate value of each digit of the square root is searched from a larger value to a smaller one like "3", "2", "1"

and "0". However, it is also possible to search it from a smaller value to a larger one like "0", "1", "2" and "3" as well. This method is allowed to be implemented by analogous means described above. Hence, no special flowchart, program and circuit are disclosed herein.

The above-mentioned square-root operating circuit according to the present invention may apply to both a binary signal and a quadruple signal as will be discussed below. A composite signal of a binary logic and a quadruple logic may be used for this operating circuit.

The quadruple logic need half as many I/O signals as the binary logic. This feature is effective in the multiplier described in the Japanese Patent Application No. 3-323205 and a squaring circuit and a comparator as will be discussed below. When the square-root operating circuit is mounted on a large-scale integration circuit (LSI), this feature is more effective in reducing the internal wiring of the LSI.

Next, the description will be oriented to the squaring circuit (referred to as an $X^2$ circuit, hereinafter) used for executing the foregoing square-root operation.

The squaring ($X^2$) logic may be represented by the following charts. The square-root operating system shown herein is arranged to obtain a square root by using the $X^2$ circuit. The multiplying circuit disclosed in the Japanese Patent Application No. 3-323205 may be used for obtaining a square root.

CHART 1

|  | $X_0{}^i$ | $X_{\frac{1}{3}}{}^i$ | $X_{\frac{2}{3}}{}^i$ | $X_1{}^i$ |
|---|---|---|---|---|
| $C_0{}^{i-1}$ |  | 1 |  | 1 |
| $C_{\frac{1}{3}}{}^{i-1}$ | 1 | 2 | 1 | 2 |
| $C_{\frac{2}{3}}{}^{i-1}$ | 2 | 3 | 2 | 3 |

CHART 2

|  | $X_0{}^i$ | $X_{\frac{1}{3}}{}^i$ | $X_{\frac{2}{3}}{}^i$ | $X_1{}^i$ |
|---|---|---|---|---|
| $C_0{}^{i-1}$ |  |  |  |  |
| $C_{\frac{1}{3}}{}^{i-1}$ |  |  | 1 | 2 |
| $C_{\frac{2}{3}}{}^{i-1}$ |  |  | 1 | 2 |
|  |  |  | 1 | 2 |

In the charts 1 and 2, $X_0$, $X_{\frac{1}{3}}$, $X_{\frac{2}{3}}$, and $x_1$ stand for equivalent logic ($X=0$), ($X=\frac{1}{3}$), ($X=\frac{2}{3}$) and ($X=1$), respectively. For example, if $X=0$, the equivalent logic ($X=0$), that is, $X_0$ is "1". The other equivalent logic are "0". Likewise, $C_0$, $C_{\frac{1}{3}}$ and $C_{\frac{2}{3}}$ stand for the equivalent logic ($C=0$), ($C=\frac{1}{3}$) and ($C=\frac{2}{3}$), respectively. The blank in the chart stands for zero.

The chart 1 illustrates a logic expression $<Z>$ for $X^2$, that is, $(Z_2, Z_1)$. The chart 2 shows a logic expression $<C>$ for a carrier output, that is, $(C_2, C_1)$. In these charts, a value of "1" is 01, a value of "2" is 10 and a value of "3" is 11.

Figure 5:
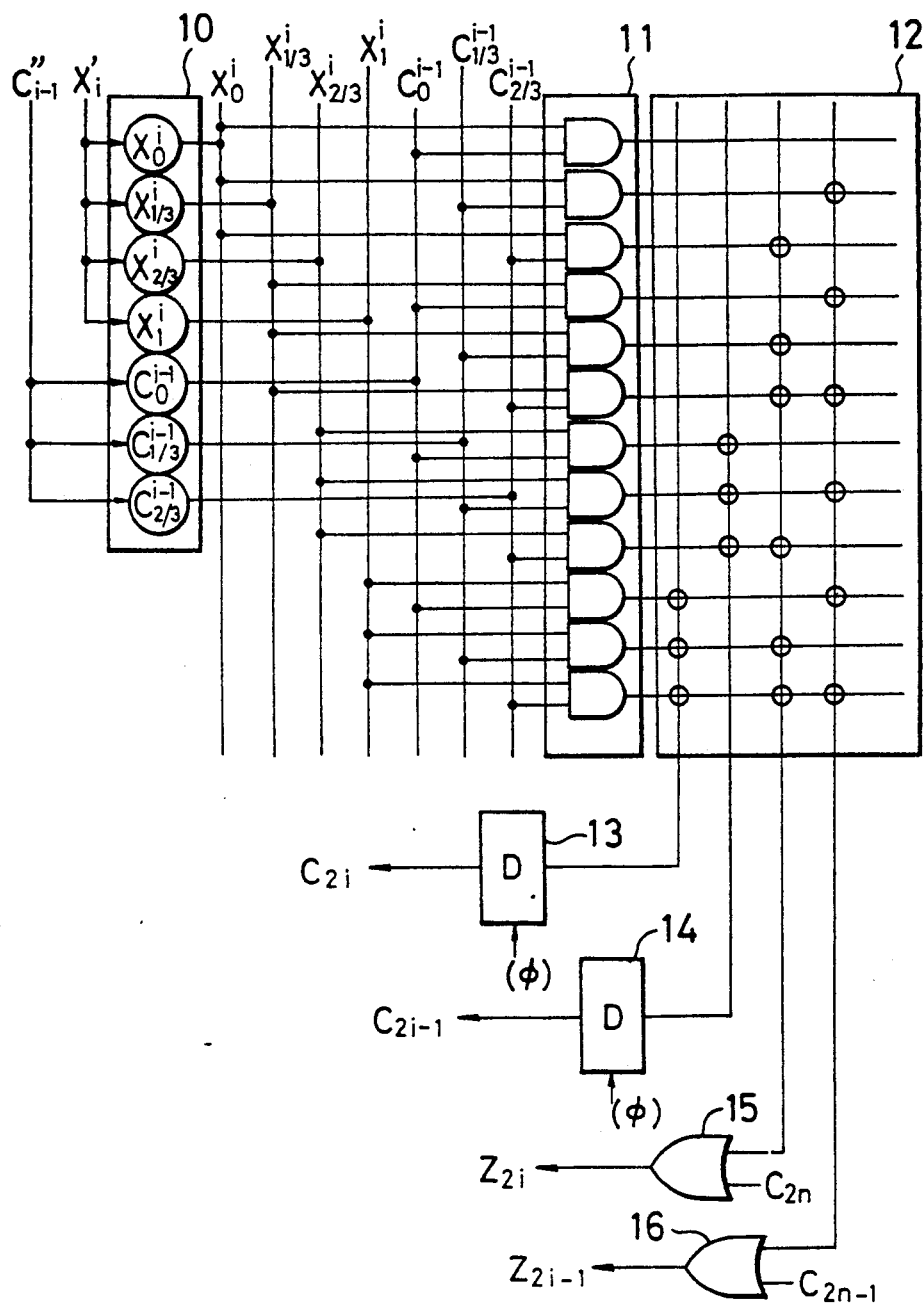
FIG. 5 is a circuit diagram showing a squaring circuit.

It is understood from the above logic expression that the $X^2$ circuit is arranged as shown in FIG. 5.

The $X^2$ circuit shown in FIG. 5 is arranged to have an equivalent circuit 10, an AND circuit 11, an OR circuit 12, delay circuits 13 and 14, and OR gates 15 and 16.

Figure 6:
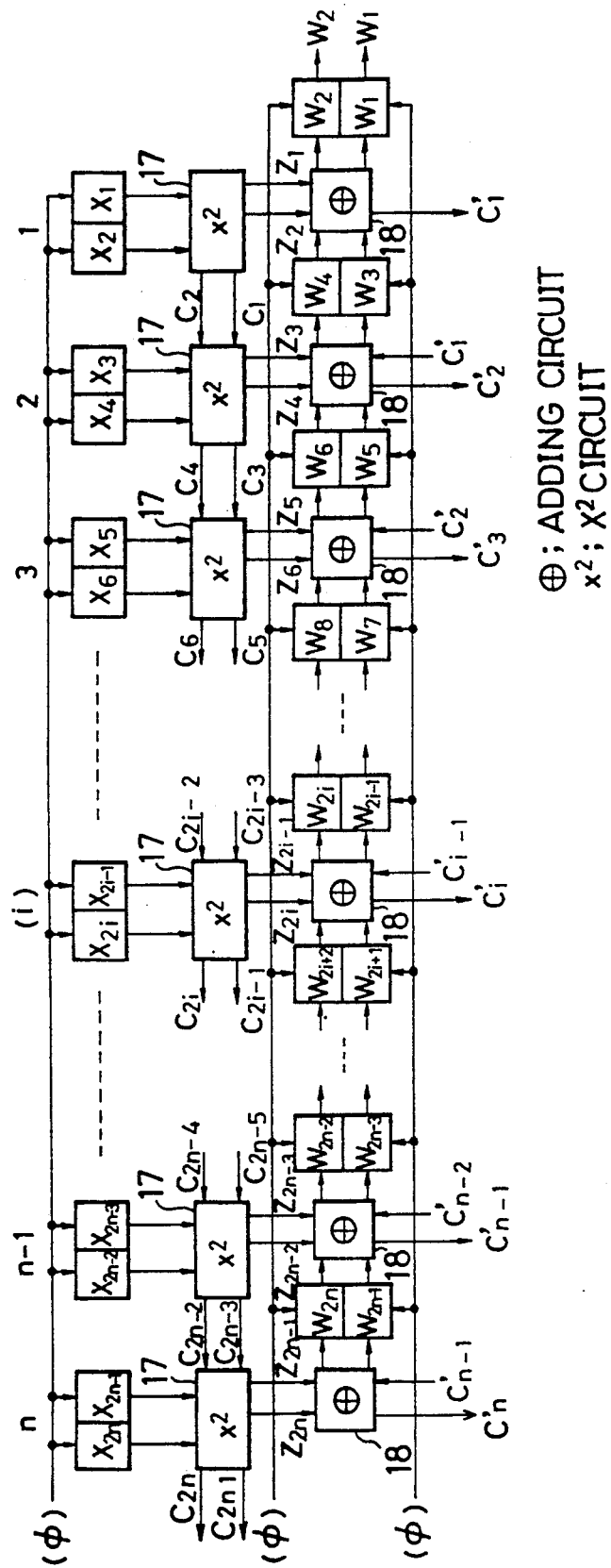
FIG. 6 is a circuit diagram showing a square-root operating circuit having a parallel square operating circuit according to the present invention.
Figure 7:
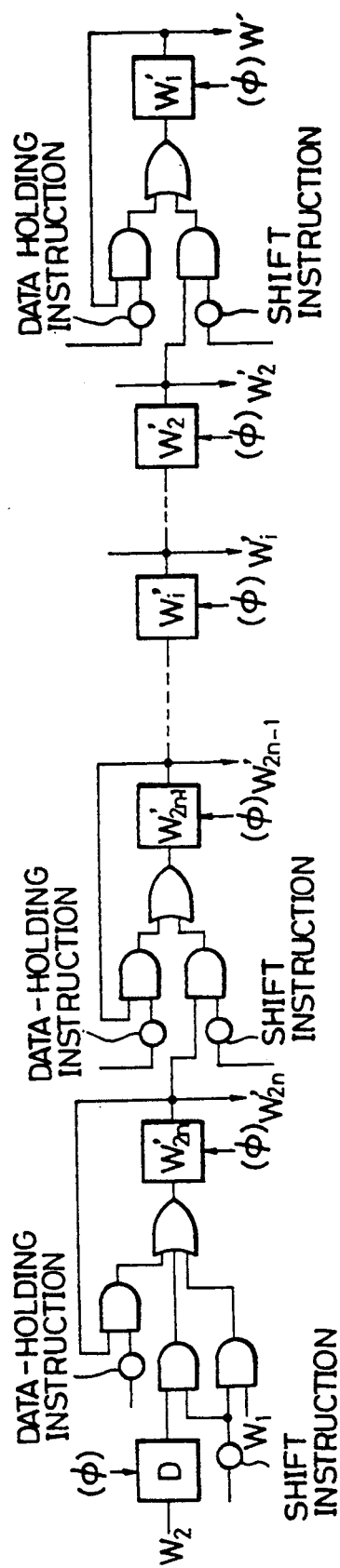
FIG. 7 is a circuit diagram showing a register connected to the circuit of FIG. 6.

To perform a parallel squaring operation, it is necessary to use the parallel squaring circuit having n of $X^2$ circuits 17 and n of the adding circuits 18 as shown in FIG. 6 and a shift register (W register) 19 for holding a value of $X^2$ as shown in FIG. 7.

The input circuit of the X register and the W register and the connecting circuit between the bits are, respectively, depending on the instructions to be executed according to the flowchart, such as $(1 \rightarrow X_{2i}, 1 \rightarrow X_{2i-1})$, $(1 \rightarrow X_{2i}, 0 \rightarrow X_{2i-1})$, $(0 \rightarrow X_{2i}, 1 \rightarrow X_{2i-1})$ and $(0 \rightarrow X_{2i}, 0 \rightarrow X_{2i-1})$.

If the quadruple logic is used in the $X^2$ circuit shown in FIG. 5, the binary signals $X_{2i}$, $X_{2i-1}$ and $C_{2i-2}$ and $C_{2i-3}$ are converted into the quadruple signals $X_i'$ and $C_{i-1}''$ according to the following chart 3.

CHART 3

| $X_{2i}$ | $X_{2i-1}$ | $C_{2i-2}$ | $C_{2i-3}$ | $X_i'$ | $C_{i-1}''$ |
|---|---|---|---|---|---|
| 0 | 0 | 0 | 0 | 0 | 0 |
| 0 | 1 | 0 | 1 | $\frac{1}{3}$ | $\frac{1}{3}$ |
| 1 | 0 | 1 | 0 | $\frac{2}{3}$ | $\frac{2}{3}$ |
| 1 | 1 | 1 | 1 | 1 | X |

The logic expression standing for the chart 3 may be represented by the following expression.

Expression 1

$$X_i' = \frac{1}{3} \overline{X_{2i}} X_{2i-1} + \frac{2}{3} X_{2i} \overline{X_{2i-1}} + X_{2i} X_{2i-1}$$

$$C_{i-1}'' = \frac{1}{3} \overline{C_{2i-2}} C_{2i-3} + \frac{2}{3} C_{2i-2} \overline{C_{2i-3}}$$

Figure 8:
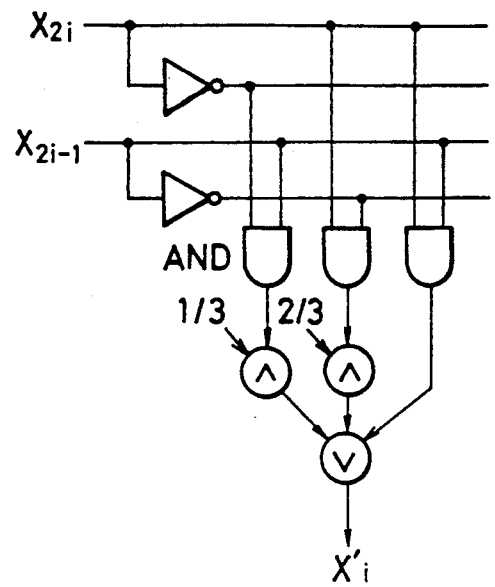
FIG. 8 is a circuit diagram showing a logic converting circuit used when a quadruple logic is used in the squaring circuit.
Figure 9:
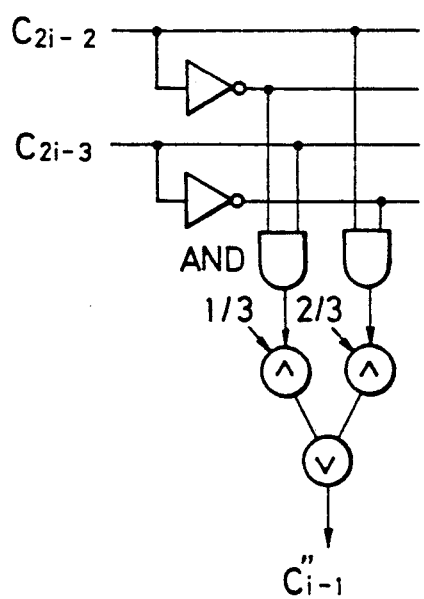
FIG. 9 is a circuit diagram showing a logic converting circuit used when a quadruple logic is used in the squaring circuit.

The logic circuit corresponding to the expression 1 is shown in FIGS. 8 and 9, where a symbol $\wedge$ stands for a quadruple AND circuit and a symbol $\vee$ stands for a quadruple OR circuit.

Figure 10:
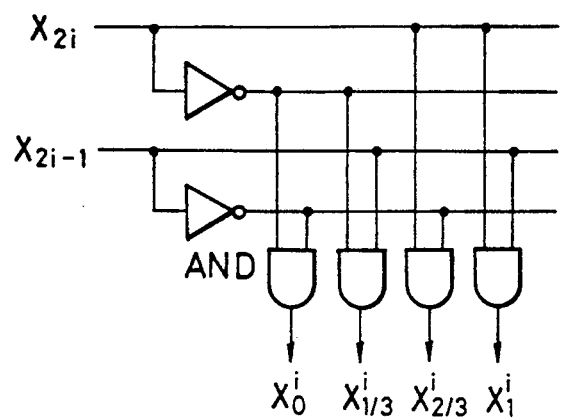
FIG. 10 is a circuit diagram showing a binary input circuit used when a binary logic is used in the squaring circuit.
Figure 11:
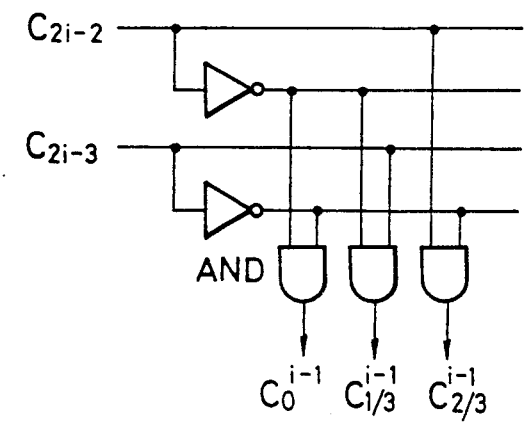
FIG. 11 is a circuit diagram showing a binary input circuit used when a binary logic is used in the squaring circuit.

If the $X^2$ circuit shown in FIG. 5 uses a binary logic, the binary signals $X_{2i}$, $X_{2i-1}$ and $C_{2i-2}$, $C_{2i-3}$ are converted into signals $X_0{}^i$, $X_{\frac{1}{3}}{}^i$, $X_{\frac{2}{3}}{}^i$, $X_1{}^i$ and $C_0{}^{i-1}$, $C_{\frac{1}{3}}{}^{i-1}$, $C_{\frac{2}{3}}{}^{i-1}$ through the effect of the binary logic input circuit shown in FIGS. 10 and 11.

Next, the description will be directed to an adding circuit arrangement included in the parallel squaring unit shown in FIG. 6.

Figure 12:
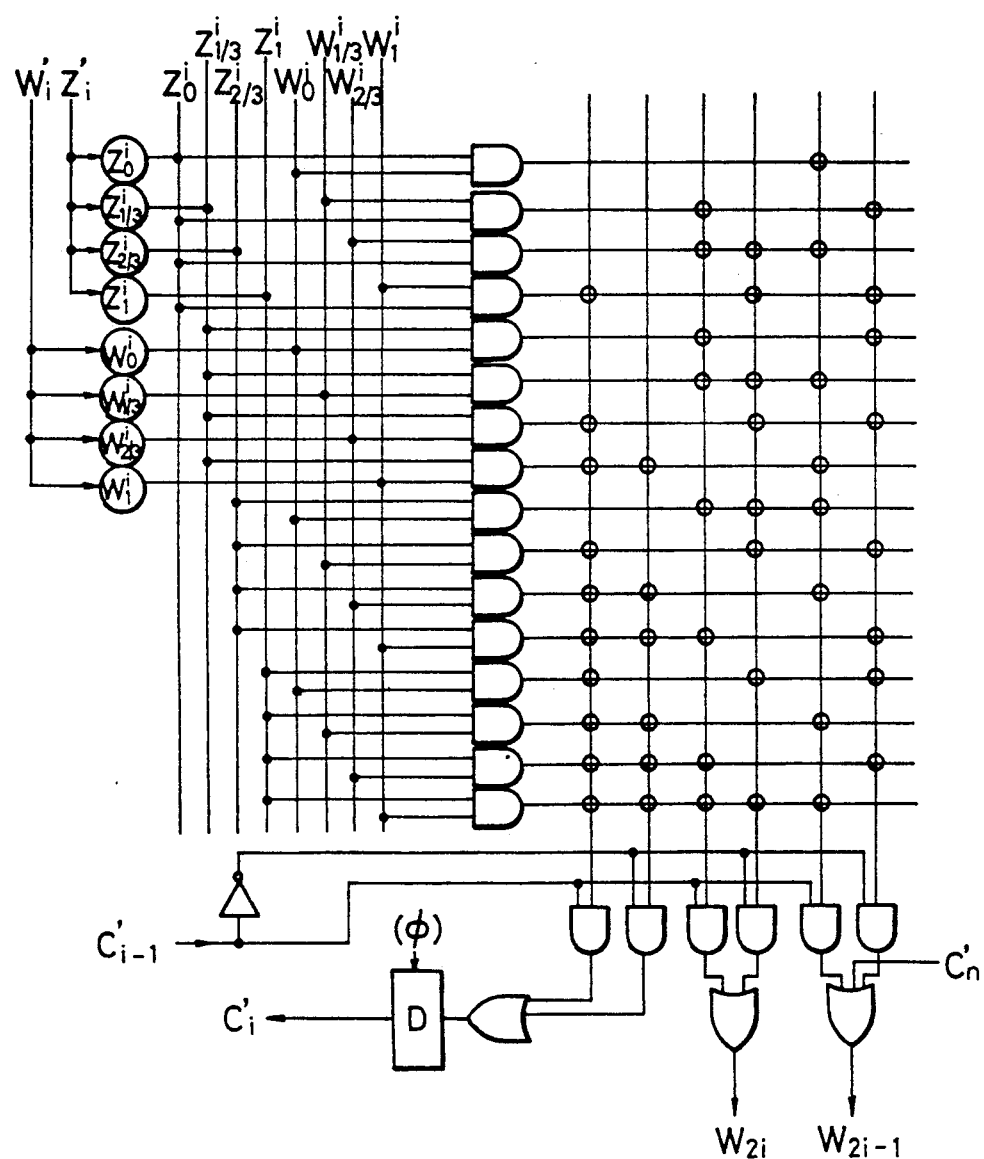
FIG. 12 is a circuit diagram showing an adding circuit used in the square-root operating circuit shown in FIG. 6.

The logic arranged in the adding circuit is the same as disclosed in the Japanese Patent Application No. 3-233219. The circuit arrangement of the adding circuit is the same as disclosed in the Japanese Patent Application No. 3-323205, which is shown in FIG. 12.

Figure 13:
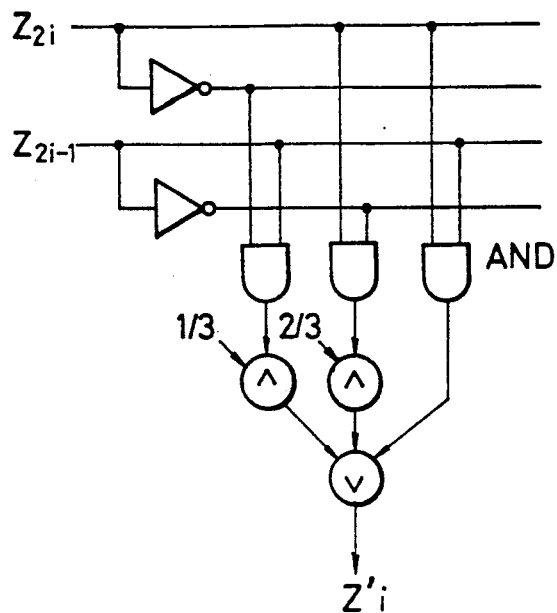
FIG. 13 is a circuit diagram showing a logic converting circuit used when a quadruple logic is used in the adding circuit.
Figure 14:
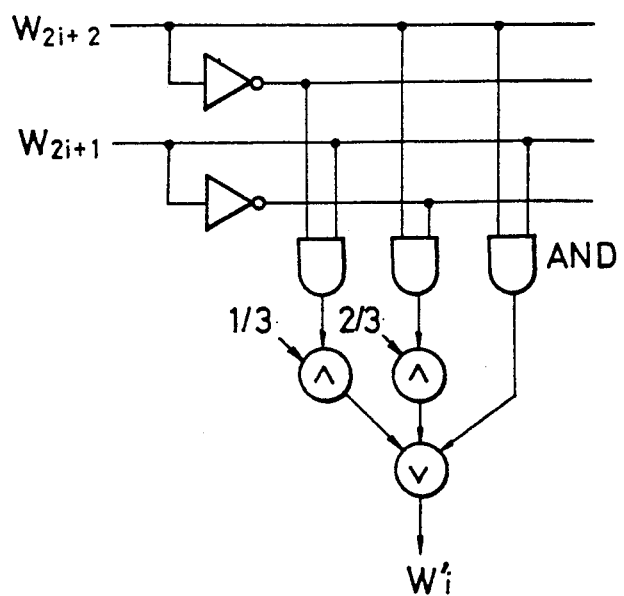
FIG. 14 is a circuit diagram showing a logic converting circuit used when a quadruple logic is used in the adding circuit.

If the adding circuit employs quadruple logic, the binary signals $Z_{2i}$, $Z_{2i-1}$ and $W_{2i+2}$, $W_{2i+1}$ are converted into the quadruple signals $Z_i'$ and $W_i'$ through the logic converting circuit shown in FIGS. 13 and 14.

Figure 15:
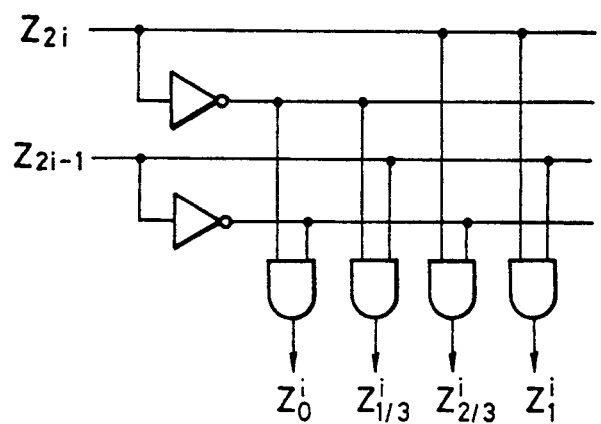
FIG. 15 is a circuit diagram showing a binary input circuit used when a binary logic is used in the adding circuit.
Figure 16:
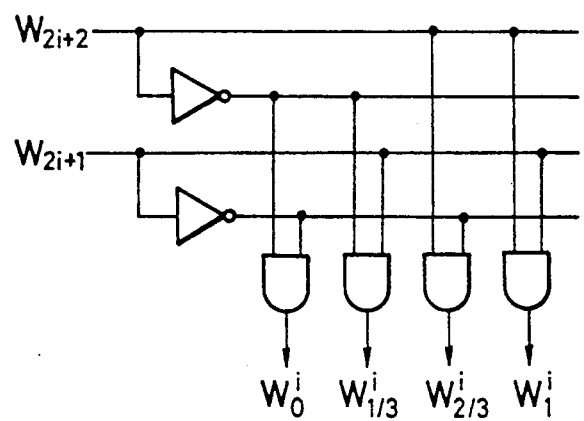
FIG. 16 is a circuit diagram showing a binary input circuit used when a binary logic is used in the adding circuit.

If the adding circuit employs binary logic, the binary signals $Z_{2i}$, $Z_{2i-1}$ and $W_{2i+2}$, $W_{2i+1}$ are converted into the signals $Z_0{}^i$, $Z_{\frac{1}{3}}{}^i$, $Z_{\frac{2}{3}}{}^i$, $Z_1{}^i$ and $W_0{}^i$, $W_{\frac{1}{3}}{}^i$, $W_{\frac{2}{3}}{}^i$, $W_1{}^i$ through the binary logic input circuit shown in FIGS. 15 and 16.

In turn the description will be oriented to a logic and a circuit arrangement of a comparator for performing a comparison about a square root.

The following chart 4 meets the relation of $S_i > W_i$, the following chart 5 meets the relation of $S_i = W_i$, and the following chart 6 meets the relation of $S_i < W_i$.

CHART 4

|  | $S_0{}^i$ | $S_{\frac{1}{3}}{}^i$ | $S_{\frac{2}{3}}{}^i$ | $S_1{}^i$ |
|---|---|---|---|---|
| $W_0{}^i$ |  | 1 | 1 | 1 |
| $W_{\frac{1}{3}}{}^i$ |  |  | 1 | 1 |
| $W_{\frac{2}{3}}{}^i$ |  |  |  | 1 |
| $W_1{}^i$ |  |  |  |  |

CHART 5

|  | $S_0{}^i$ | $S_{\frac{1}{3}}{}^i$ | $S_{\frac{2}{3}}{}^i$ | $S_1{}^i$ |
|---|---|---|---|---|
| $W_0{}^i$ | 1 |  |  |  |
| $W_{\frac{1}{3}}{}^i$ |  | 1 |  |  |

CHART 5-continued

|  | $S_0{}^i$ | $S_{\frac{1}{3}}{}^i$ | $S_{\frac{2}{3}}{}^i$ | $S_1{}^i$ |
|---|---|---|---|---|
| $W_{\frac{2}{3}}{}^i$ |  |  | 1 |  |
| $W_1{}^i$ |  |  |  | 1 |

CHART 6

|  | $S_0{}^i$ | $S_{\frac{1}{3}}{}^i$ | $S_{\frac{2}{3}}{}^i$ | $S_1{}^i$ |
|---|---|---|---|---|
| $W_0{}^i$ |  |  |  |  |
| $W_{\frac{1}{3}}{}^i$ | 1 |  |  |  |
| $W_{\frac{2}{3}}{}^i$ | 1 | 1 |  |  |
| $W_1{}^i$ | 1 | 1 | 1 |  |

In each of these charts 4 to 6, $S_0$, $S_{\frac{1}{3}}$, $S_{\frac{2}{3}}$ and $S_1$ stand for equivalent logic ($S=0$), ($S=\frac{1}{3}$), ($S=\frac{2}{3}$), and $S=1$), respectively. Likewise, $W_0$, $W_{\frac{1}{3}}$, $W_{\frac{2}{3}}$ and $W_1$ stand for equivalent logic ($W=0$), ($W=\frac{1}{3}$), ($W=\frac{2}{3}$) and ($W=1$), respectively.

Figure 17:
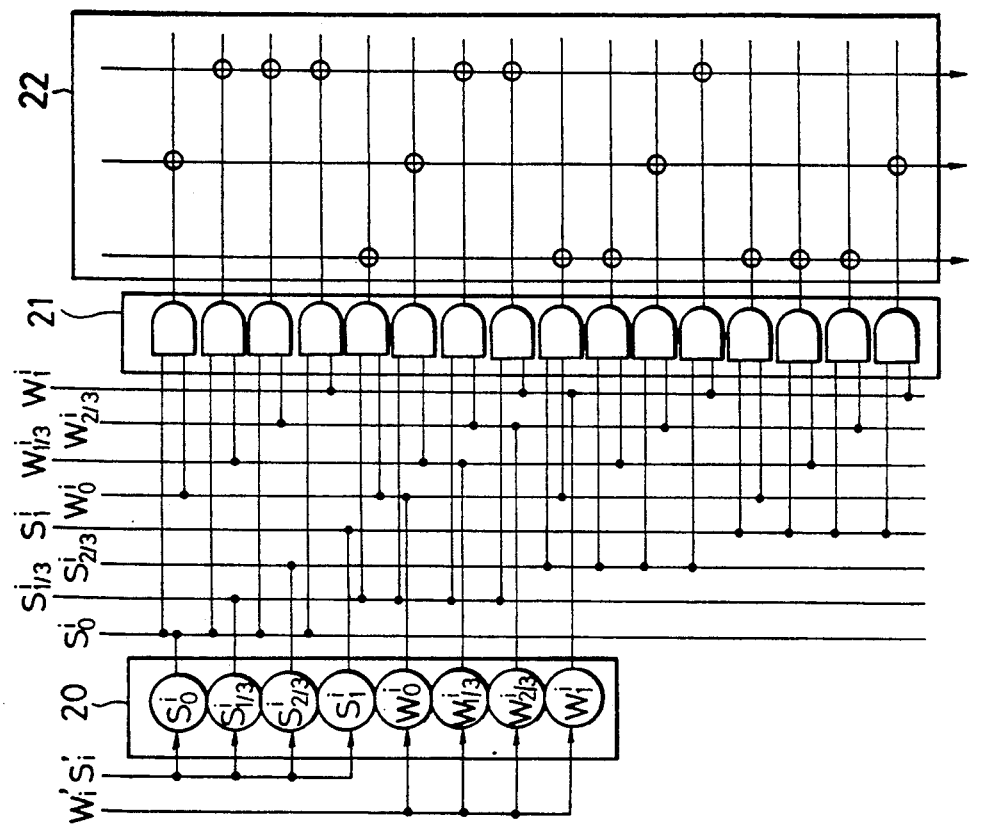
FIG. 17 is a circuit diagram showing a comparator used in the square-foot operating circuit.
Figure 18:
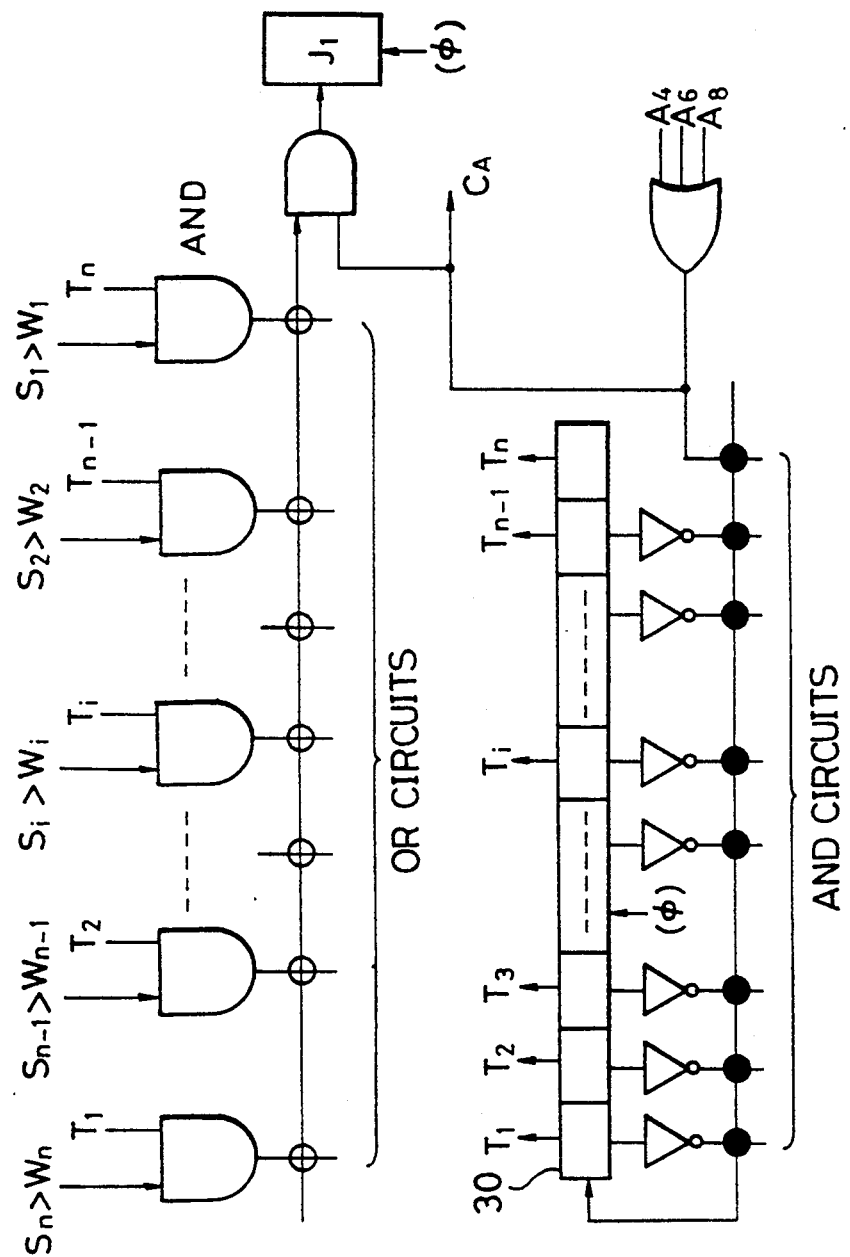
FIG. 18 is a circuit diagram showing a S>W determining circuit of the comparator.
Figure 19:
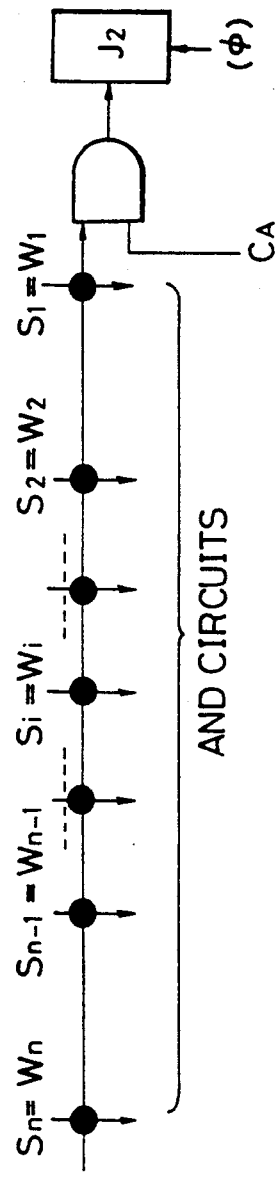
FIG. 19 is a circuit diagram showing a S=W determining circuit of the comparator.
Figure 20:
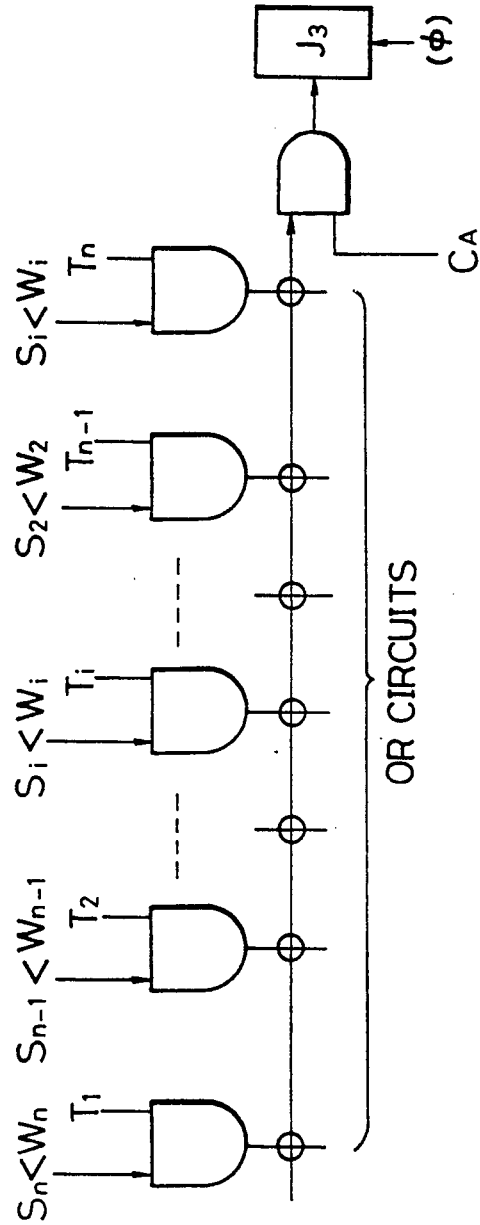
FIG. 20 is a circuit diagram showing a S<W determining circuit of the comparator.
Figure 21:
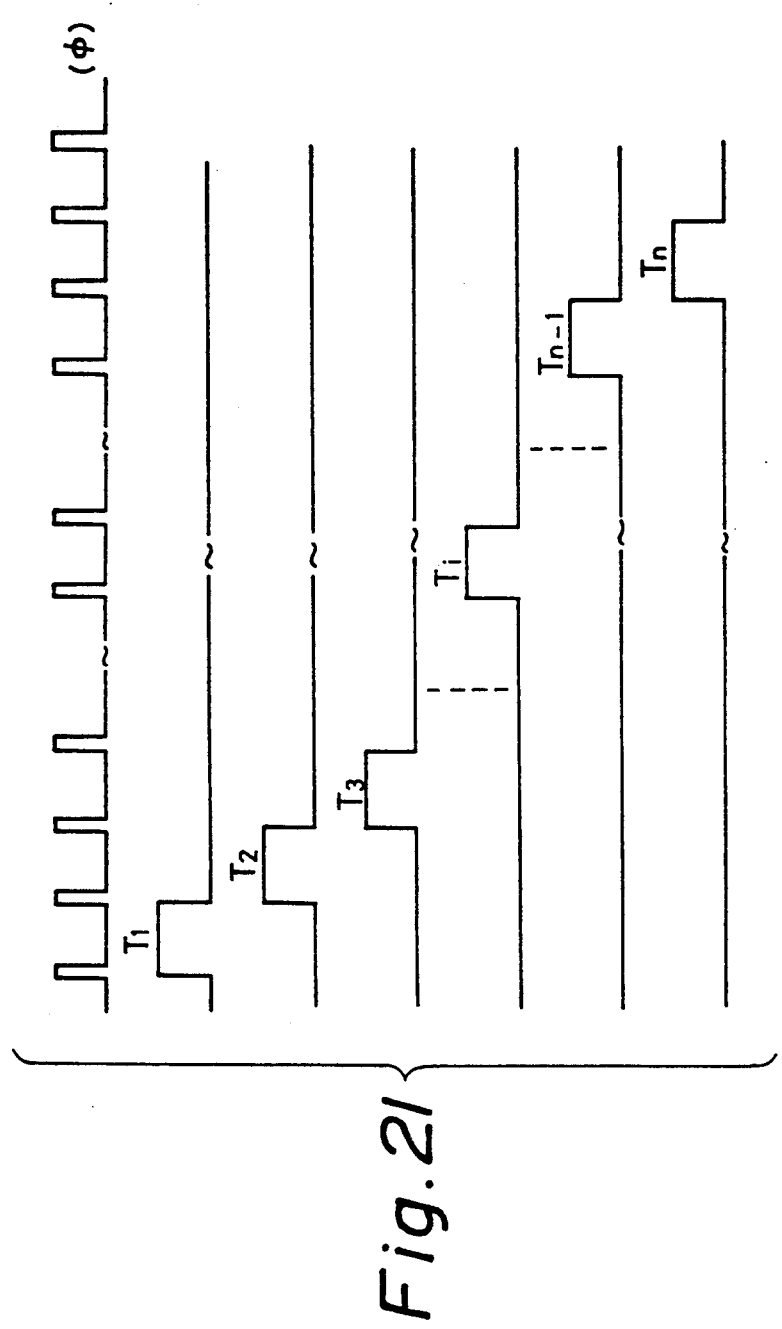
FIG. 21 is a waveform showing a search signal to be fed to the S>W determining circuit and the S<W determining circuit.

It is understood from these charts that the comparator may be arranged to have an equivalent value circuit 20, an AND circuit 21, and an OR circuit 22 as shown in FIG. 17. This comparator serves to compare S with W at each digit. To complete the comparison of S with W, however, it is necessary to compare the values of S and W at all the digits with each other. In this respect, the circuit for determining if $S>W$ is shown in FIG. 18. The circuit for determining if $S=W$ is shown in FIG. 19. The circuit for determining if $S<W$ is shown in FIG. 20. Regarding timing shown in FIG. 21, search signal $T_1$ to $T_n$ are supplied to the AND gate to which the compared result for each digit is applied from the circuits shown in FIGS. 18 and 20.

Figure 22:
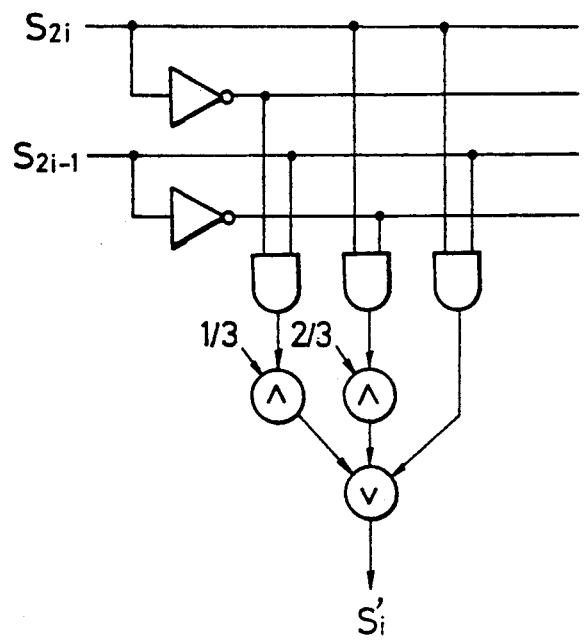
FIG. 22 is a circuit diagram showing a logic converting circuit used when a quadruple logic is used in the comparator.
Figure 23:
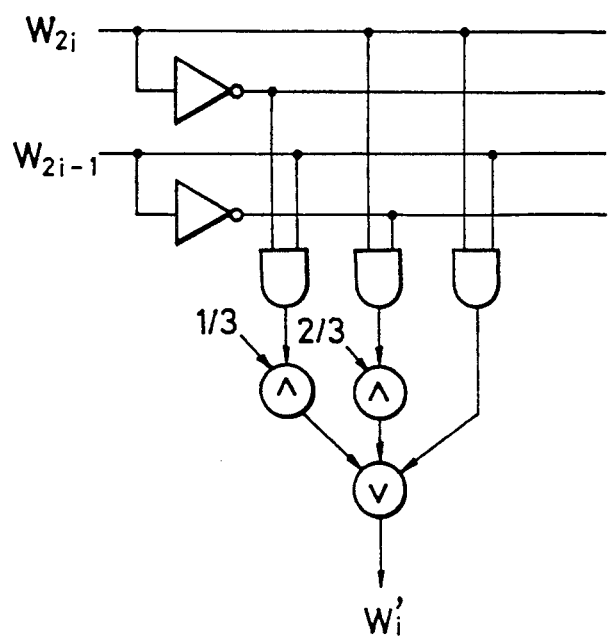
FIG. 23 is a circuit diagram showing a logic converting circuit used when a quadruple logic is used in the comparator.

If this comparator employs a quadruple logic, the binary signals $S_{2i}$, $S_{2i-1}$ and $W_{2i}$, $W_{2i-1}$ are converted into the quadruple signals $S_i'$ and $W_i'$ through the logic converting circuits shown in FIGS. 22 and 23. In these figures, a symbol V stands for a quadruple OR circuit and a symbol $\Lambda$ stands for a quadruple AND circuit.

Figure 24:
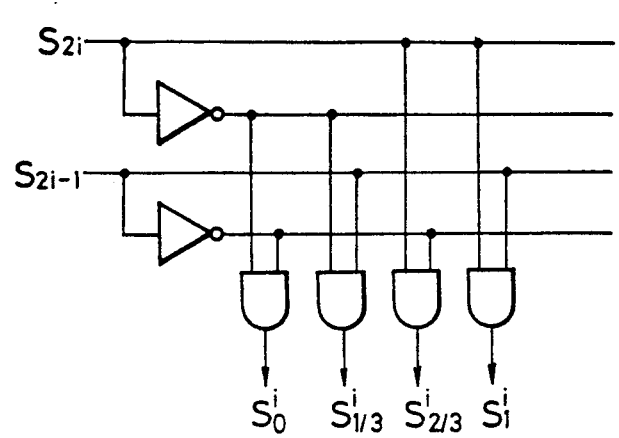
FIG. 24 is a circuit diagram showing a binary input circuit used when a binary logic is used in the comparator.
Figure 25:
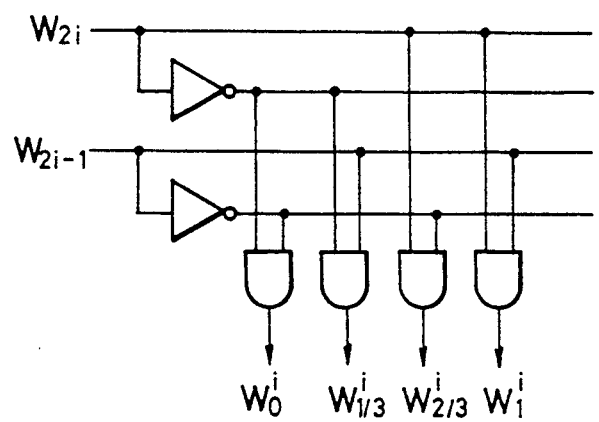
FIG. 25 is a circuit diagram showing a binary input circuit used when a binary logic is used in the comparator.

If this comparator employs binary logic, the binary signals $S_{2i}$, $S_{2i-1}$ and $W_{2i}$, $W_{2i-1}$ are converted into the signals $S_0{}^i$, $S_{\frac{1}{3}}{}^i$, $S_{\frac{2}{3}}{}^i$, $S_1{}^i$ and $W_0{}^i$, $W_{\frac{1}{3}}{}^i$, $W_{\frac{2}{3}}{}^i$, $W_1{}^i$ through the binary input circuits shown in FIGS. 24 and 25.

In the square root operating system, the operating result of $X^2 \rightarrow W$ is determined at maximum n-bit time later and the compared result at each digit is applied to the OR circuit included in the $S>W$ determining circuit. This holds true for either the operating system employing a squaring circuit or a multiplier disclosed in Japanese Patent Application No. 3-323205. When it is applied, the search signal is supplied to the $S>W$ determining circuit in sequence from the highest digits. If it is detected that "1" has risen on a digit, $S>W$ is determined. The $J_1$ is set so as to establish "1". This is true for the determination of $S<W$. If S is equal to W at all the digits, $(S_n=W_n, S_{n-1}=W_{n-1}, \ldots, S_i=W_i, \ldots, S_2=W_2, S_1=W_1)$, the relation of $S=W$ is determined. Then, $J_2$ is set so as to establish "1".

The determining method arranged as above makes it possible to far more rapidly execute the comparison than in known methods for detecting a borrow output given by a substraction and executing the comparison about the detected output.

Figure 26:
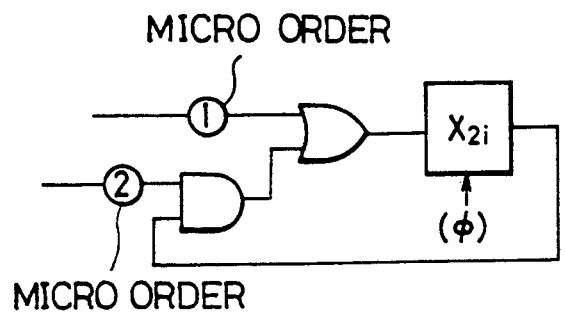
FIG. 26 is a circuit diagram showing an $0 \rightarrow X_{2i}$ and an $1 \rightarrow X_{2i}$ circuits used in the square-root operating circuit.
Figure 27:
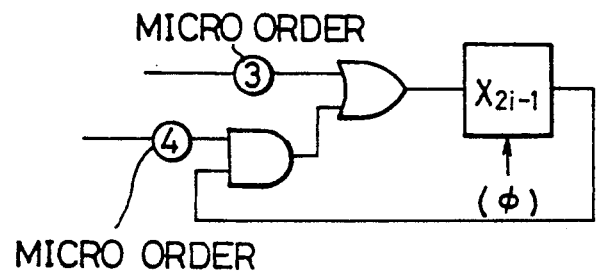
FIG. 27 is a circuit diagram showing an $0 \rightarrow X_{2i-1}$ and $1 \rightarrow X_{2i-1}$ circuits used in the square-root operating circuit.

Next, a circuit for executing the operation of $0 \rightarrow X_{2i}$ or $1 \rightarrow X_{2i}$ is shown in FIG. 26. A circuit for executing the operation of $0 \rightarrow X_{2i-1}$ or $1 \rightarrow X_{2i-1}$ is shown in FIG. 27. By feeding micro orders to these circuits according to chart 7, it is possible to set the values of $X_{2i}$ and $X_{2i-1}$ as "0" or "1".

CHART 7

| ① | ② | ③ | ④ | $X_{2i}$ | $X_{2i-1}$ |  |
|---|---|---|---|---|---|---|
| 0 | 0 | 0 | 0 | 0 | 0 | ("0") |
| 0 | 1 | 0 | 1 | Hold |  |  |
| 0 | 0 | 1 | 0 | 0 | 1 | ("1") |
| 1 | 0 | 0 | 0 | 1 | 0 | ("2") |
| 1 | 0 | 1 | 0 | 1 | 1 | ("3") |

① $= A_2 + A_4 J_3$
③ $= A_2 + A_6 J_3$

Figure 28:
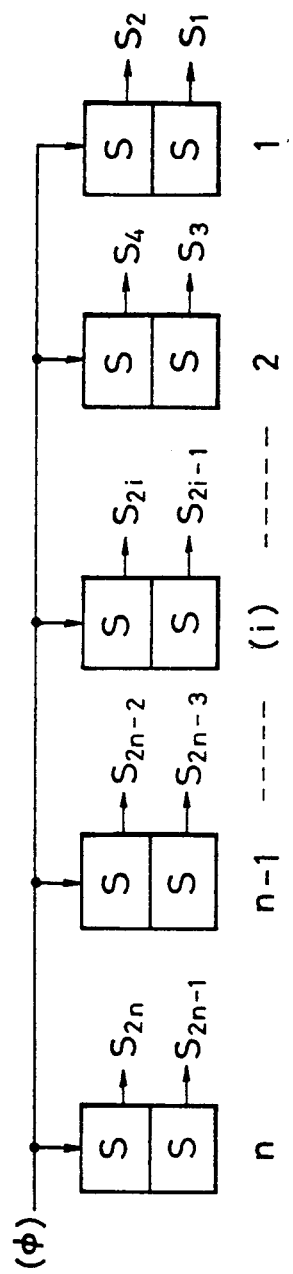
FIG. 28 is a circuit diagram showing an S register used in the square-root operating circuit.
Figure 29:
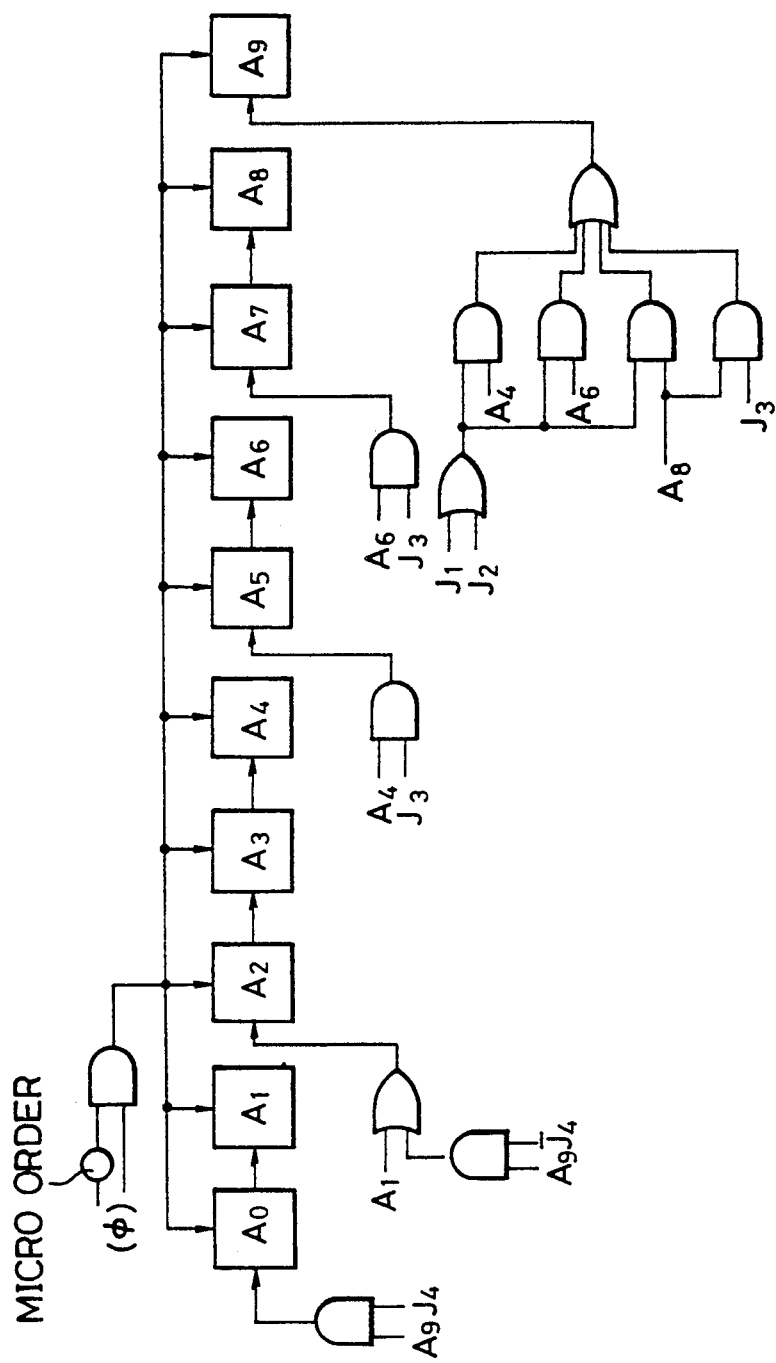
FIG. 29 is a circuit diagram showing an address circuit for a square-root operating program shown in FIG. 2 or FIG. 4.

FIG. 28 shows one arrangement of an S register. FIG. 29 shows one arrangement of an address circuit for executing the programs shown in FIGS. 2 and 4. In FIGS. 28 and 29, $J_4$ denotes a circuit to be set when $i=1$ and to be implemented by the normal means. Hence, the circuit $J_4$ is not illustrated herein.

Figure 30:
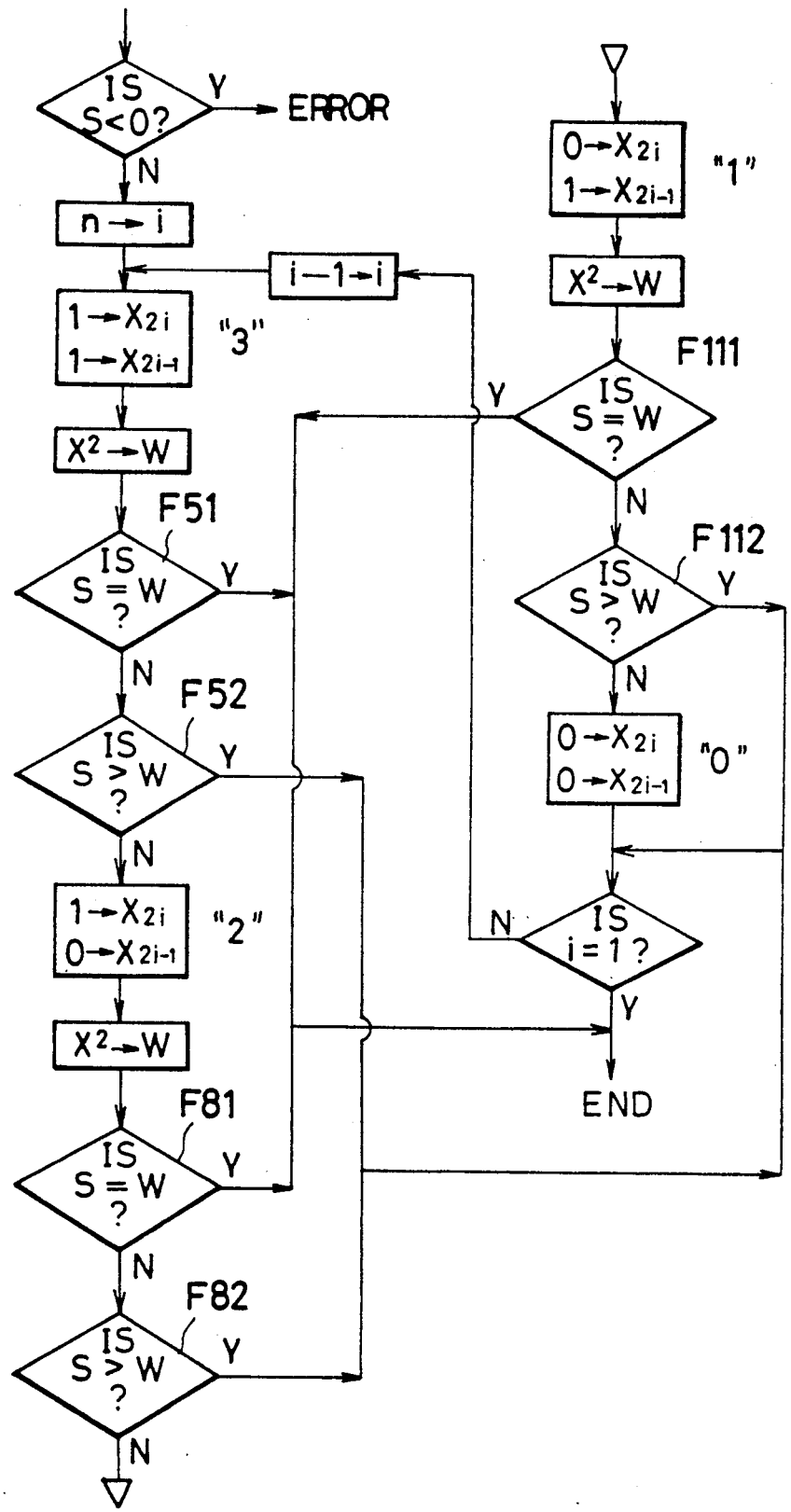
FIG. 30 is a flowchart showing an operation of a squaring type square-root operating circuit according to the present invention.

In turn, the description will be directed to another operating system to be performed by the square-root operating circuit of the present invention as referring to FIGS. 30 and 31.

This operating system is a transformation of the operating system as shown in FIGS. 1 and 2. The operating system shown in FIGS. 1 and 2 is arranged to obtain an n-digit square root, while the operating system in FIGS. 30 and 31 is arranged to terminate a square-root operation when $S=W$ is established.

As shown in FIG. 30, each of the steps F5, F8 and F11 of the flowchart shown in FIG. 1 is divided into the determinations of $S>W$ and $S=W$. That is, those steps are transformed into the steps F51, F52, F81, F82, F111 and F112, respectively. If $S=W$ is given, the square-root operation is terminated.

As shown in the program of FIG. 31, when $S=W$ is given at the execution address $A_4$, $J_2$ is set. At the execution addresses $A_6$ and $A_8$, if $S=W$ is given, $J_2$ is set. When the initial address $A_O$ is respectively transferred into the next address, the square-root operation is terminated.

FIG. 32 shows an arrangement of an address circuit where this operating system is executed.

Figure 33:
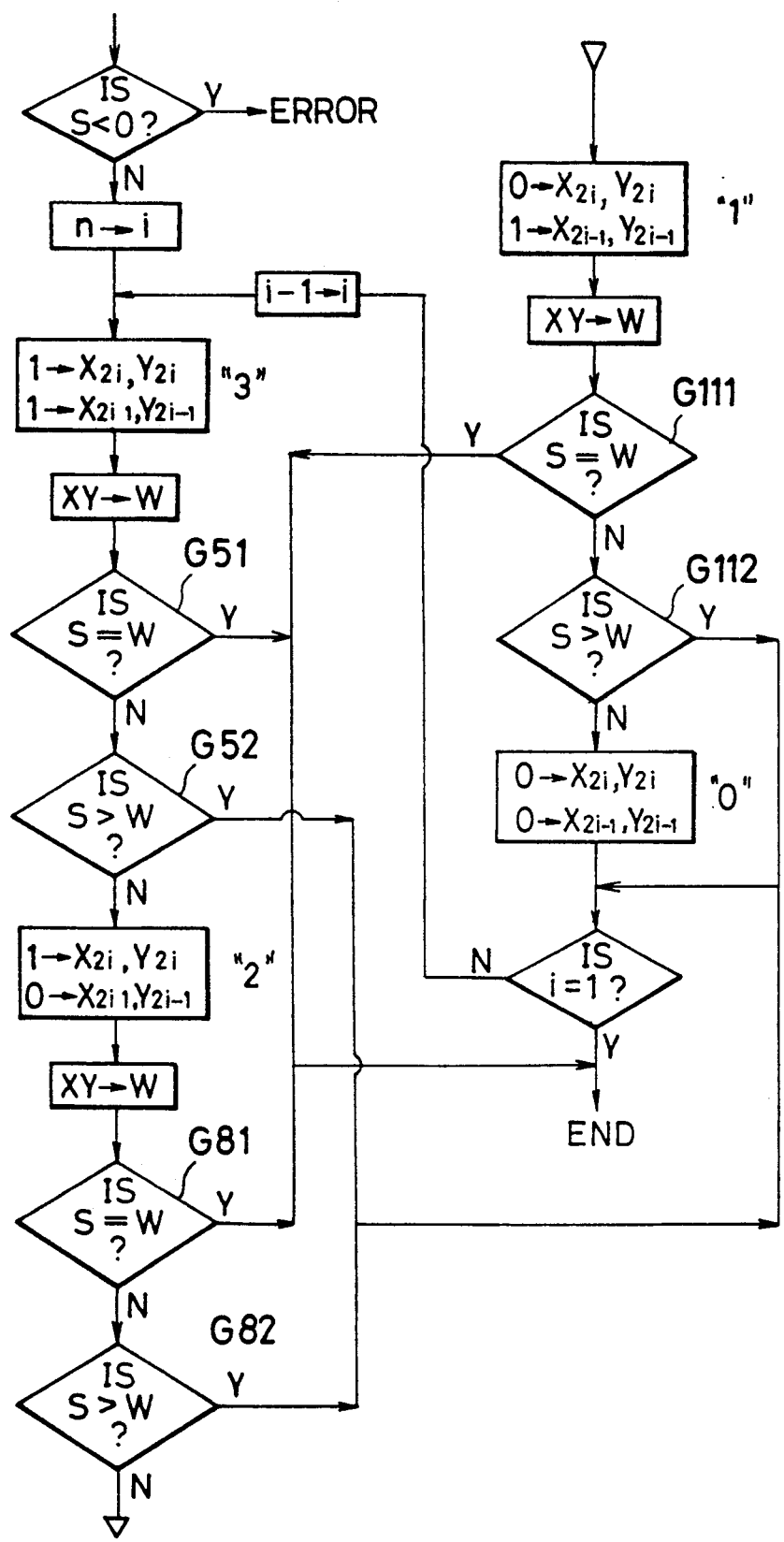
FIG. 33 is a flowchart showing an operation of the multiplying type square-root operating circuit according to the present invention.

Next, the description will be directed to another operating system to be done by the square-root operating circuit of the present invention as referring to FIGS. 33 and 34.

This operating system is also a transformation of the operating system shown in FIGS. 3 and 4. The operating system shown in FIGS. 3 and 4 is arranged to obtain an n-digit square root by using a parallel multiplier, while this transformational operating system is arranged to terminate a square-root operation if $S=W$ is given.

That is, as shown in FIG. 33, the steps G5, G8 and G11 of the flowchart shown in FIG. 3 are divided into the determination of $S>W$ and $S=W$. Concretely, those steps G5, G8 and G11 are transformed into the new steps G51, G52, G81, G82 G111, and G112. If $S=W$ is established, the square-root operation is terminated.

As shown in the program of FIG. 34, when $S=W$ is established at the execution address $A_4$, $J_2$ is set. At the execution addresses $A_6$ and $A_8$, is $S=W$ is established, $J_2$ is set. The initial address $A_O$ is respectively transformed into the next address. Then, the square-root operation is terminated.

The present operating system may employ the address circuit shown in FIG. 32.

The operating time consumed in the square-root operating circuit of the invention will be discussed later.

To operate a square root of the value consisting of n bits, n-bit time is needed for one squaring or multiplication. To obtain a square root per one digit, a maximum of three squares or multiplications are necessary. Since in actuality the squaring or multiplication is done when $0 \to X_{2i}$ and $0 \to X_{2i-1}$ (or $0 \to X_{2i}$, $Y_{2i}$, $0 \to X_{2i-1}$, $Y_{2i-1}$) are done, four times are considered to ne approximately maximum. In this case, the squaring or multiplying time needs 4n-bit time. By repeating in n/2 time corresponding to n/2 digit, a maximum of $2n^2$ is needed for obtaining a square root.

When the operating system of this invention needs a square-root operation for all binary bits, the necessary operations are approximately as many as two operations, that is, $2n \times 2 \times n$. In total, $4n^2$-bit time is needed. It means that the approximate maximum bit time can be reduced in half. In other words, the operating speed is doubled. This means that the reduction of a physical clock frequency in a half does not change the operating speed.

Expansively considered, the time of operating a square root changes as shown by a graph of FIG. 35. The graph indicates that the use of a quadruple logic makes is possible to obtain the highest square-root operating speed.

The square-root operating system disclosed herein may be the same serial operating system as described in the Japanese Patent Application No. 3-323205.

Many widely different embodiment of the present invention may be constructed without departing from the spirit and scope of the present invention. It should be understood that the present invention is not limited to the specific embodiments described in the specification, except as defined in the appended claims.

What is claimed is:

1. A square-root operating circuit adapted to perform a square-root at high speed of both a binary signal and a quadruple signal, comprising:

means for performing a square of an input signal, said performing means arranged to perform said square of a candidate square-root of any one of an originally quadruple logic input signal and a quadruple logic input signal converted from binary logic; and means for comparing said input signal with said square of the candidate square-root at each digit and for outputting a result of each comparison so as to discriminate a proper digit of said square-root.

2. The square-root operating circuit of claim 1, wherein said performing means includes an equivalent circuit for inputting said input signal and for outputting an equivalent signal having an equivalent value which corresponds to said input signal;

a first logic circuit connected to said equivalent circuit for performing a logical product of said equivalent signal output from said equivalent circuit with a logical product of said equivalent signal having a different equivalent value and for outputting a signal corresponding to a result of said logical product;

a second logic circuit connected to said first logic circuit for performing a logical sum of said signal output from said first logic circuit and for outputting a signal corresponding to a result of said logical sum;

a delay circuit connected to said second logic circuit for delaying a specific signal output from said second logic circuit and for outputting said delayed specific signal; and logic gate means connected to said second logic circuit for performing a logical sum of another specific signal output from said second logic circuit with an externally supplied input signal.

3. The square-root operating circuit of claim 2, wherein said equivalent circuit is arranged to receive a plurality of input signals and to output equivalent signals having equivalent values corresponding to said plurality of input signals, respectively.

4. The square-root operating circuit of claim 3, wherein said first logic circuit includes a plurality of AND gates, each of said plurality of AND gates being adapted to receive two equivalent signals having different equivalent values for performing a logical product therebetween and adopted to output a signal corresponding to a result of logical product.

5. The square-root operating circuit of claim 4, wherein said first logic circuit is arranged that at least one of said plurality of AND gates outputs said signal corresponding to said result of logical product.

6. The square-root operating circuit of claim 5, wherein said second logic circuit is arranged that said signals output from said plurality of AND gates are separated into a plurality of different groups, each of said plurality of different groups being arranged to output a signal corresponding to said result of said logical sum.

7. The square-root operating circuit of claim 6, wherein said delay circuit includes a plurality of delaying elements, each of said plurality of delaying elements being arranged to receive a signal output from a corresponding group of said plurality of different groups in said second logic circuit for delaying said received signal with a predetermined phrase shift and to output said delayed signal as a carrying signal.

8. The square-root operating circuit of claim 7, wherein said logic gate means includes a plurality of logic gates, each of said plurality of logic gates being arranged to receive a signal output from a corresponding group of said plurality of different groups in said second logic circuit for performing a logical sum of said received signal with said input received externally and to output a signal corresponding to a result of said logical sum as a binary signal.

9. The square-root operating of circuit claim 1, wherein said comparing means is an adding circuit which is selectively adapted to employ any one of a quadruple logic and a binary logic.

10. The square-root operating circuit of claim 9, wherein said adding circuit includes a logic converting circuit for converting a plurality of binary signals into a plurality of quadruple signals.

11. The square-root operating circuit of claim 9, wherein said adding circuit includes a binary logic input circuit for converting and is so arranged that a plurality of binary signals are converted into a plurality of signals through said binary logic input circuit.

12. The square-root operating circuit of claim 1, wherein said square-root operating circuit is a parallel squaring circuit adapted to perform a parallel squaring operation.

13. The square-root operating circuit of claim 12, includes said parallel squaring circuit further comprising a plurality of first shift registers connected to said performing means for holding a value corresponding to said input signal.

14. The square-root operating circuit of claim 13, said parallel squaring circuit further comprising a plurality of second shift registers for holding a result obtained in said comparing means.

15. The square-root operating circuit of claim 1, wherein said comparing means is arranged so that a search signal is supplied to each digit determined in parallel and said comparison is determined by a first digit of timing in said search signal.

16. The square-root operating circuit of claim 1, said comparing means including
   an equivalent circuit for inputting said input signal and for outputting an equivalent signal having an equivalent value which corresponds to said input signal;
   a first logic circuit connected to said equivalent circuit for performing a logical product of said equivalent signal output from said equivalent circuit with a logical product of said equivalent signal having a different equivalent value and for outputting a signal corresponding to a result of said logical product; and
   a second logic circuit connected to said first logic circuit for performing a logical sum of said signal output from said first logic circuit and for outputting a signal corresponding to a result of said logical sum.

17. The square-root operating circuit of claim 16, wherein said equivalent circuit is arranged so that said input signal includes two kinds of input signals, said two kinds of input signals including a first kind of input signal and a second kind of input signal.

18. The square-root operating circuit of claim 17, wherein said second logic circuit is arranged so that said signal corresponding to said result of said logical sum includes three kinds of output signals according to a comparison result between said two kinds of input signals, said three kinds of output signals including a first kind of output signal, a second kind of output signal, and a third kind of output signal.

19. The square-root operating circuit of claim 18, wherein said second logic circuit is arranged so that said first kind of output signal represents said first kind of input signal being larger than said second kind of input signal, said second kind of output signal represents said first kind of input signal being equal to said second kind of input signal, and said third kind of output signal represents said first kind of input signal being less than said second kind of input signal, as said comparison result.

20. A square-root method adapted to be used in a square-root operating circuit for obtaining a square-root by executing an operation n times at maximum, said square-root operating circuit having a plurality of circuits, each of said plurality of circuits including an AND logic element, an OR logic element, and a register, said square-root operating circuit further having a 2n-bit S register for storing a value to be operated, S, an X register for storing a candidate value X of the square-root, and a W register for storing a square result W, said value S to be operated and said candidate value X of a square root being stored in corresponding registers in sequence from the most significant digits, said square-root method comprising the steps of:
   (1) determining whether said value S is negative;
   (2) determining whether an error takes place, said error occurring when said value S is determined as negative;
   (3) setting a value of 3 as a candidate value of said square root to digits X2i and X2i−1 of said X register;
   (4) squaring said candidate value X to get $X^2$ and substituting $X^2$ for W;
   (5) determining whether $S \geq W$;
   (6) determining said value of 3 as said digits of said square-root if $S \geq W$;
   (7) setting a value of 2 as a candidate value of said square-root to digits X2i and Xwi−1 of said X register if $S < W$;
   (8) squaring said candidate value X to get $X^2$ and substituting $X^2$ for said square result W;
   (9) determining whether $S \geq W$;
   (10) determining said value of 2 as said digits of said square-root if $S \geq W$;
   (11) setting a value of 1 as a candidate value of said square-root to digits X2i and X2i of said X register if $S < W$;
   (12) squaring said candidate value X to get $X^2$ and substituting $X^2$ for said square result W;
   (13) determining whether $S \geq W$;
   (14) determining said value of 1 as said digits of said square-root if $S \geq W$;
   (15) setting a value of 0 as a candidate value of said square-root to digits X2i and X2i−1 of said X register if $S < W$; and
   (16) repeating said steps (3) to (15) decrementing i from n to 1.

21. A square-root method adapted to be used in a square-root operating circuit for obtaining a square-root by executing an operation n times a maximum, said square-root operating circuit having a plurality of circuits, each of said plurality of circuits including an AND logic element, an OR logic element, and a register, said square-root operating circuit further having a 2n-bit S register for storing a value to be operated S, an X register for storing a candidate value X of the square-root, and a W register for storing a square result W, said value S to be operated and said candidate value X of the square-root being stored in corresponding registers in sequence from the most significant digits, said square-root method comprising the steps of:
   (1) determine whether said value S is negative;
   (2) determining whether an error takes place, said error occurring when said value S is determined as negative;
   (3) setting a value of 3 as a candidate value of said square root to digits X2i and X2i−1 of said X register;
   (4) squaring said candidate value X to get $X^2$ and substituting $X^2$ for said square result W;
   (5) determining whether $S = W$;
   (6) terminating said square-root method if $S = W$;
   (7) determining whether $S > W$ if $S \neq W$;
   (8) determining a value of 3 as said digits of said square-root if $S > W$;
   (9) setting a value of 2 as a candidate value of said square-root to digits X2i and X2i−1 of said X register if $S \leq W$;
   (10) squaring said candidate value X to get $X^2$ and substituting $X^2$ for said square result W;
   (11) determining whether $S = W$;
   (12) terminating said square-root method if $S = W$;
   (13) determining whether $S > W$ if $S \neq W$;

(14) determining a value of 2 as said digits of said square-root if $S>W$;
(15) setting a value of 1 as a candidate value of said square root to digits $X2i$ and $X2i-1$ of said X register if $S \leq W$;
(16) squaring said candidate value X to get $X^2$ and substituting $X^2$ for said square result W;
(17) determining whether $S=W$;
(18) terminating said square-root method if $S=W$;
(19) determining whether $S>W$ if $S \neq W$;
(20) determining a value of 1 as said digits of said square-root if $S>W$;
(21) setting a value of 0 as a candidate value of said square-root to digits $X2i$ and $X2i-1$ of said X register if $S \leq W$; and
(22) repeating said steps (3) to (21) decrementing i from n to 1.

* * * * *